(12) United States Patent
Mori

(10) Patent No.: US 8,398,353 B2
(45) Date of Patent: Mar. 19, 2013

(54) PRINT PROCESSING SYSTEM, PRINT PROCESSING METHOD, AND STORAGE MEDIUM

(75) Inventor: Yasuo Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 12/637,611

(22) Filed: Dec. 14, 2009

(65) Prior Publication Data

US 2010/0149565 A1  Jun. 17, 2010

(30) Foreign Application Priority Data

Dec. 16, 2008  (JP) .................................. 2008-319990

(51) Int. Cl.
*B42C 13/00* (2006.01)
(52) U.S. Cl. .......... 412/14; 358/1.15; 358/1.18; 412/11; 271/176; 399/38; 399/45; 399/82; 399/407; 399/408
(58) Field of Classification Search ..................... 412/11, 412/14; 399/45, 397, 407, 408
See application file for complete search history.

(56) References Cited

U.S. PATENT DOCUMENTS

| 6,070,023 | A | 5/2000 | Kataoka | |
|---|---|---|---|---|
| 2002/0057453 | A1* | 5/2002 | Michaelis et al. | ........... 358/1.15 |
| 2007/0172279 | A1 | 7/2007 | Yokobori | |
| 2008/0172302 | A1 | 7/2008 | Knodt | |

FOREIGN PATENT DOCUMENTS

| JP | 10-151734 A | 6/1998 |
|---|---|---|
| JP | 10-167557 A | 6/1998 |
| JP | 2007-196503 A | 8/2007 |
| JP | 2008-171405 A | 7/2008 |

\* cited by examiner

*Primary Examiner* — Dana Ross
*Assistant Examiner* — Leonel Vasquez
(74) *Attorney, Agent, or Firm* — Canon USA, Inc., I.P. Division

(57) ABSTRACT

A print server checks a job ticket for a print job to be processed. When a method of printing set in the printing attributes of the job ticket is case binding, a first thickness of a bookblock is calculated using the paper type set in the printing attributes. The print server calculates a second thickness of a bookblock using the paper type after a change. The print server changes the paper type set in the job ticket when the difference between the first thickness and the second thickness is within a permissible range.

19 Claims, 30 Drawing Sheets

| JOB ID 81 | JOB TRACKING ID 82 | IN-DEVICE JOB ID 83 | JOB STATE 84 | JOB ATTRIBUTE (USER NAME, FILE NAME ETC.) 85 |
|---|---|---|---|---|
| 1 | 834fbf07-86d3-4226-93df-20f36c299844 | 0x11180 | PRINTING | kayama, SPECIFICATION.pdf, 1 COPY |
| 2 | 0fcb1cc7-6e14-411e-9638-fd8f57c9ca3a | | | Kurotsu, sample.pdf, 2 COPIES |

| | | |
|---|---|---|
| JOB ID | 2 | 1001 |
| JOB TRACKING ID | 0fcb1cc7-6e14-411e-9638-fd8f57c9ca3a | 1002 |
| CONTENT URL | http://PC-la/ID-100.pdf | |
| JOB NAME | Sample.pdf | |
| PRINTING METHOD | TWO-SIDED PRINTING | |
| NUMBER OF COPIES TO PRINT | 2 COPIES | 1005a |
| PAPER TYPE | PLAIN PAPER | |
| PAPER SIZE | A4 | |
| TOTAL NUMBER OF PAGES | UNCLEAR | |
| EXCEPTION SETTING — PAGES 1-2 — PAPER TYPE | THICK PAPER | |
| EXCEPTION SETTING — PAGES 23-24 — PAPER TYPE | THICK PAPER | |

(1005 brackets the entire settings block)

FIG.11

| RECEPTION NUMBER | JOB TRACKING ID | IN-DEVICE JOB ID | JOB STATE | JOB ATTRIBUTE (USER NAME, FILE NAME ETC.) |
|---|---|---|---|---|
| 1101 | 834fbf07-86d3-4226-93df-20f36c299844 | 0x11180 | PRINTING | kayama, SPECIFICATION.pdf, 1 COPY |
| 1102 | 0fcb1cc7-6e14-411e-9638-fd8f57c9ca3a | 0x11181 | RECEIVING | Kurotsu, sample.pdf, 2 COPIES |

PAPER TYPE SETTING

DISPLAY PAPER(D): ALL

PAPER TYPE(P):

| NAME ▲ | TYPE | GRAMMAGE | COLOR | SURFACE PROPERTY | CHARACTERISTICS |
|---|---|---|---|---|---|
| THICK PAPER 2(129~1... | BASIC SHEET | 140g/m² | WHITE | HIGH-QUALITY PAPER | NONE |
| THICK PAPER 3(151~1... | BASIC SHEET | 166g/m² | WHITE | HIGH-QUALITY PAPER | NONE |
| THICK PAPER 4(181~2... | BASIC SHEET | 195g/m² | WHITE | HIGH-QUALITY PAPER | NONE |
| THICK PAPER 5(210~2... | BASIC SHEET | 233g/m² | WHITE | HIGH-QUALITY PAPER | NONE |
| THICK PAPER 6(257~3... | BASIC SHEET | 279g/m² | WHITE | HIGH-QUALITY PAPER | NONE |
| PLAIN PAPER(80~1)... | BASIC SHEET | 93g/m² | WHITE | HIGH-QUALITY PAPER | NONE |
| ONE-SIDED COATED PAPER 1(... | BASIC SHEET | 93g/m² | WHITE | ONE-SIDED COATED PAPER | NONE |
| ONE-SIDED COATED PAPER 2(... | BASIC SHEET | 117g/m² | WHITE | ONE-SIDED COATED PAPER | NONE |
| ONE-SIDED COATED PAPER 3(... | BASIC SHEET | 140g/m² | WHITE | ONE-SIDED COATED PAPER | NONE |
| ONE-SIDED COATED PAPER 4(... | BASIC SHEET | 166g/m² | WHITE | ONE-SIDED COATED PAPER | NONE |

OK    CANCEL    HELP(H)

| | |
|---|---|
| PAPER ID | ~2101 |
| PAPER NAME | ~2102 |
| GRAMMAGE | ~2103 |
| SURFACE PROPERTY | ~2104 |
| SHAPE | ~2105 |
| COLOR | ~2106 |
| FABRIC DIRECTION | ~2107 |
| GLOSSINESS ADJUSTMENT | ~2108 |

ACQUISITION OF PAPER INFORMATION

DISPLAY PAPER(D): ALL
PAPER TYPE(P):

| NAME ▲ | TYPE | GRAMMAGE | COLOR | SURFACE PROPERTY | CHARACTERISTICS |
|---|---|---|---|---|---|
| THICK PAPER 2(129~1... | BASIC SHEET | 140g/m² | WHITE | HIGH-QUALITY PAPER | NONE |
| THICK PAPER 3(151~1... | BASIC SHEET | 166g/m² | WHITE | HIGH-QUALITY PAPER | NONE |
| THICK PAPER 4(181~2... | BASIC SHEET | 195g/m² | WHITE | HIGH-QUALITY PAPER | NONE |
| THICK PAPER 5(210~2... | BASIC SHEET | 233g/m² | WHITE | HIGH-QUALITY PAPER | NONE |
| THICK PAPER 6(257~3... | BASIC SHEET | 279g/m² | WHITE | HIGH-QUALITY PAPER | NONE |
| PLAIN PAPER(80~1)... | BASIC SHEET | 93g/m² | WHITE | HIGH-QUALITY PAPER | NONE |
| ONE-SIDED COATED PAPER 1(... | BASIC SHEET | 93g/m² | WHITE | ONE-SIDED COATED PAPER | NONE |
| ONE-SIDED COATED PAPER 2(... | BASIC SHEET | 117g/m² | WHITE | ONE-SIDED COATED PAPER | NONE |
| ONE-SIDED COATED PAPER 3(... | BASIC SHEET | 140g/m² | WHITE | ONE-SIDED COATED PAPER | NONE |
| ONE-SIDED COATED PAPER 4(... | BASIC SHEET | 166g/m² | WHITE | ONE-SIDED COATED PAPER | NONE |

2201 — ACQUIRE PAPER INFORMATION

OK    CANCEL    HELP(H)

PAPER TYPE SETTING

DISPLAY PAPER(D): ALL

☑ DISPLAY ONLY PAPER TYPES HAVING SIMILAR THICKNESS TO SPINE — 2701

PAPER TYPE(P):

| NAME ▲ | TYPE | GRAMMAGE | COLOR | SURFACE PROPERTY | CHARACTERISTICS |
|---|---|---|---|---|---|
| THICK PAPER 2 (129~1... | BASIC SHEET | 140g/m² | WHITE | HIGH-QUALITY PAPER | NONE |
| THICK PAPER 3 (151~1... | BASIC SHEET | 166g/m² | WHITE | HIGH-QUALITY PAPER | NONE |
| THICK PAPER 4 (181~2... | BASIC SHEET | 195g/m² | WHITE | HIGH-QUALITY PAPER | NONE |
| THICK PAPER 5 (210~2... | BASIC SHEET | 233g/m² | WHITE | HIGH-QUALITY PAPER | NONE |
| THICK PAPER 6 (257~3... | BASIC SHEET | 279g/m² | WHITE | HIGH-QUALITY PAPER | NONE |
| PLAIN PAPER (80~1)... | BASIC SHEET | 93g/m² | WHITE | HIGH-QUALITY PAPER | NONE |
| ONE-SIDED COATED PAPER 1 (... | BASIC SHEET | 93g/m² | WHITE | ONE-SIDED COATED PAPER | NONE |
| ONE-SIDED COATED PAPER 2 (... | BASIC SHEET | 117g/m² | WHITE | ONE-SIDED COATED PAPER | NONE |
| ONE-SIDED COATED PAPER 3 (... | BASIC SHEET | 140g/m² | WHITE | ONE-SIDED COATED PAPER | NONE |
| ONE-SIDED COATED PAPER 4 (... | BASIC SHEET | 166g/m² | WHITE | ONE-SIDED COATED PAPER | NONE |

[OK]  [CANCEL]  [HELP(H)]

FIG.28A
2800

| | |
|---|---|
| JOB NAME | ~2801 |
| PRINTER NAME | ~2802 |
| PRINTING METHOD | ~2803 |
| NUMBER OF COPIES | ~2804 |
| COLLATE BY TYPE | ~2805 |
| STAPLE SETTING | ~2806 |
| PAPER TYPE | ~2807 |
| SPINE INFORMATION | ~2808a |
| SPINE INFORMATION | ~2808b |

FIG.28B
2808

| | |
|---|---|
| SPINE ORIGINAL LINK | ~2809 |
| SPINE THICKNESS | ~2810 |
| BOOKBLOCK STACK GRAMMAGE | ~2811 |
| BOOKBLOCK STACK SURFACE PROPERTY | ~2812 |

| |
|---|
| JOB NAME ~2801 |
| PRINTER NAME ~2802 |
| PRINTING METHOD ~2803 |
| NUMBER OF COPIES ~2804 |
| COLLATE BY TYPE ~2805 |
| STAPLE SETTING ~2806 |
| PAPER TYPE ~2807 |
| SPINE THICKNESS ~3101 |

| |
|---|
| JOB NAME ~2801 |
| PRINTER NAME ~2802 |
| PRINTING METHOD ~2803 |
| NUMBER OF COPIES ~2804 |
| COLLATE BY TYPE ~2805 |
| STAPLE SETTING ~2806 |
| PAPER TYPE ~2807 |
| SPINE THICKNESS ~3101 |
| IMAGES (YES/NO) ~3201 |
| COLORING (YES/NO) ~3202 |

PRINT PROCESSING SYSTEM, PRINT PROCESSING METHOD, AND STORAGE MEDIUM

BACKGROUND OF THE INVENTION

1. Field of the Invention

The present invention relates to a print processing system, print processing method and storage medium and, in particular, relates to those adapted for use when printing after changing the settings of a print job.

2. Description of the Related Art

Commercial printing such as Print on Demand (POD) employs a workflow in which a print job is retained temporarily in a job management system which is either internal or external to the printer. The print job is printed after settings for the paper type, image quality, or the like are re-set. Commercial printing such as POD includes in-line preparation of not only punch holes and stapling, but also bookbinding operations required for side-stitching bookbinding such as the application of glue to the back section and provision of a cover.

As one technique for side-stitching bookbinding, Japanese Patent Application Laid-Open No. 10-151734 discusses a technique of changing information to be printed on a spine according to the thickness of the spine. In addition, Japanese Patent Application Laid-Open No. 2007-196503 discusses the measurement of the thickness of the spine during the first print copy. Japanese Patent Application Laid-Open No. 2008-171405 discusses preparation of volumes when a spine width exceeds an allowable range for side-stitching bookbinding. Japanese Patent Application Laid-Open No. 10-167557 discusses a technique of using paper thickness and the number of sheets of paper to calculate a spine thickness and then determining paper size to be used in the cover according to the calculated thickness.

However, since none of the above conventional techniques take into account a change to job settings when the job is temporarily retained, an unsuitable spine may result due to a change in the paper thickness resulting from a change of the paper type.

Furthermore, although the above conventional techniques include retaining the print jobs on the premise that the paper type will be changed, a change to the paper type having a suitable thickness is difficult.

SUMMARY OF THE INVENTION

The present invention is directed to a method enabling suitable performance of post-print processing in which a final processing result is affected by paper thickness.

According to an aspect of the present invention, a print processing system is configured to receive a print job input from an application and to retain and edit the print job. The print processing system includes a first determination unit configured to determine whether a setting related to post-processing of a print product in the print job is affected by paper thickness, a second determination unit configured to determine whether a difference between a first dimension and a second dimension is within a first permissible range when the first determination unit determines that the setting related to post-processing of the print product in the print job is affected by paper thickness, the first dimension being with respect to a direction of thickness at a predetermined position on an output product obtained by post-processing of the print product before a change in the setting and the second dimension being with respect to a direction of thickness at a predetermined position on an output product obtained by post-processing of the print product after the change in the setting, a setting change unit configured to change the setting related to post-processing of the print product to the setting after the change when the second determination unit determines that the difference between the first dimension and the second dimension is within the first permissible range, and a setting change limitation unit configured to limit the change on the setting related to post-processing of the print product when the second determination unit determines that the difference between the first dimension and the second dimension is not within the first permissible range.

According to an exemplary embodiment of the present invention, when print job settings are affected by paper thickness, settings related to the post-processing of the printed product are changed so that a difference in dimensional thickness at predetermined positions on the output product before and after the change is within a permissible range. Thus, a large discrepancy of product dimensions after the change from the corresponding dimensions before the change can be prevented or reduced. Consequently, post-print processing, which is affected by paper thickness, can be more adequately performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of a job ticket according to an exemplary embodiment of the present invention.

FIG. 11 illustrates an example of a job management table according to an exemplary embodiment of the present invention.

FIG. 16 illustrates an example of a dialog window displayed as a result of a user pressing a button to open the dialog window configured to change paper type via the screen illustrated in FIG. 15 according to an exemplary embodiment of the present invention.

FIG. 20 illustrates an example of a GUI displayed on a display by implementing an application configured to issue a print job in a client computer according to an exemplary embodiment of the present invention.

FIG. 21 illustrates an example of paper information registered in a network printer and used in an application of a client computer or a print server according to an exemplary embodiment of the present invention.

FIG. 22 illustrates an example of a GUI configured to receive a user operation triggering acquisition of paper information from a network printer according to an exemplary embodiment of the present invention.

FIG. 27 illustrates another example of a dialog window displayed by a user pressing a button to open the dialog window configured to change paper type via the screen illustrated in FIG. 15 according to an exemplary embodiment of the present invention.

FIGS. 28A and 28B illustrate a first modified example of a job ticket according to an exemplary embodiment of the present invention.

FIG. 31 illustrates a second modified example of a job ticket according to an exemplary embodiment of the present invention.

FIG. 32 illustrates a third modified example of a job ticket according to an exemplary embodiment of the present invention.

DESCRIPTION OF THE EMBODIMENTS

Various exemplary embodiments, features, and aspects of the invention will be described in detail below with reference to the drawings.

Figure 1:
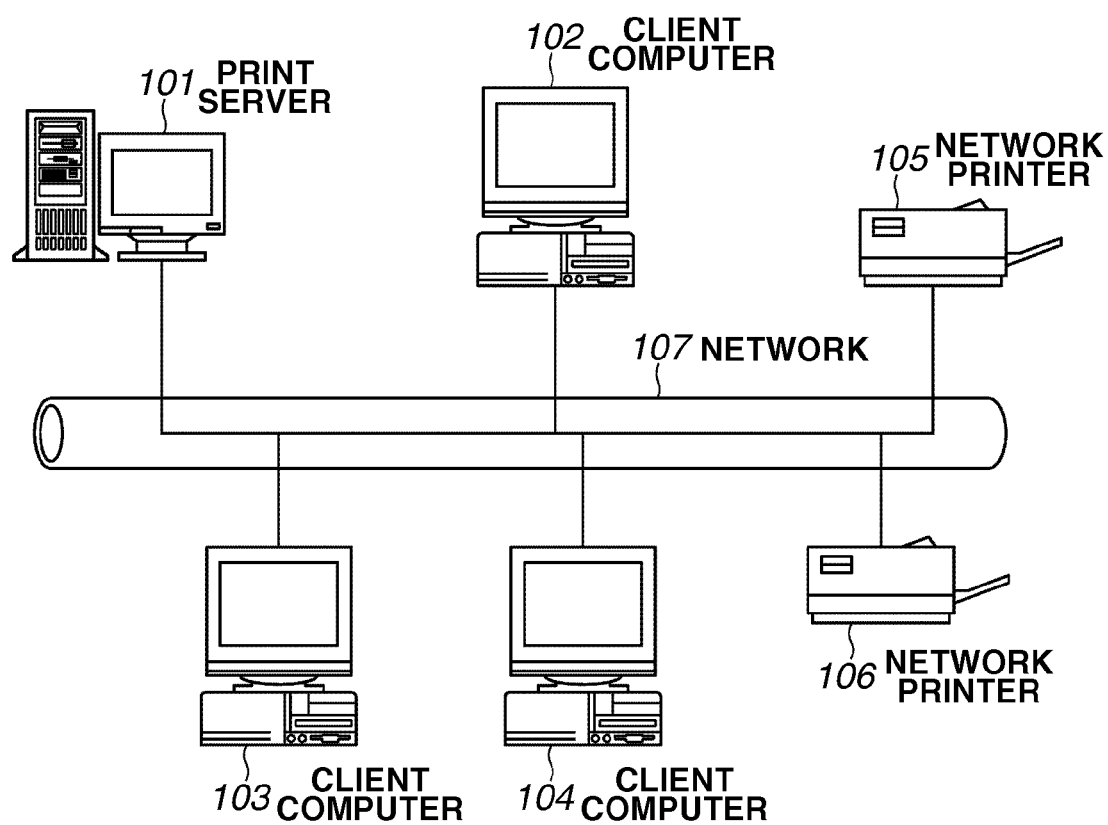
FIG. 1 is a block diagram illustrating an example of a configuration of a print processing system according to an exemplary embodiment of the present invention.

FIG. 1 is a block diagram illustrating an example of a configuration of a print processing system according to an exemplary embodiment of the present invention.

In FIG. 1, client computers 102-104 are information processing apparatuses connected to a network 107 via a network cable such as Ethernet or the like. The client computers 102-104 can implement various programs such as application programs inputting print jobs. Furthermore a printer driver is installed on the client computers 102-104 and has the function of switching print data to a printer language adaptable to network printers 105 and 106. The client computers 102-104 can register a plurality of printer drivers.

FIG. 1 illustrates an example in which three client computers 102-104 are provided in a print processing system. However, the number of client computers is not limited to three and one to several client computers may be provided.

The print server 101 is an information processing apparatus which is connected to the network 107 via a network cable. The print server 101 stores files used in the network 107 and monitors the state of use of the network 107. The print server 101 manages a plurality of network printers 105 and 106 connected to the network 107.

The client computers 102-104 and the print server 101 may be configured by storing printer control programs configured to perform various control operations in a general information processing apparatus.

When a general information processing apparatus is used as the print server 101, the function of the client computers 102-104 may be implemented simultaneously by the print server 101.

When the print server 101 receives a print job including print data from the client computers 102-104, the print job is stored in a storage medium. Then, the print job stored in the storage medium is output to the network printers 105 and 106 and printed. Then, when the print server 101 receives a print job not including print data from the client computers 102-104, the print server 101 manages the printing sequence of the client computers 102-104. The print server 101 notifies the client computers 102-104 undergoing a printing sequence that transmission of a print job including print data is permitted. Thereafter, the print server 101 acquires various types of information for the print job or the status of the network printers 105 and 106 and notifies the client computers 102-104 of the acquired information.

The network printers 105 and 106 are connected to the network 107 via a network interface. When the network printers 105 and 106 receive a print job including print data from the client computers 102-104, the print job is analyzed and the print data is converted to single-page dot images. The network printers 105 and 106 print the print data converted to dot images onto respective pages (implements the print job). Furthermore, the network printers 105 and 106 may provide at least one of the print server 101 and the client computers 102-104 with a print job management function specified by ISO10175 (Document Printing Application (DPA)).

The network printers 105 and 106 or the corresponding network interface cards may be configured to implement the functions performed by the print server 101 or the server function of the print server 101.

FIG. 1 illustrates an example of two network printers 105 and 106 provided in the print processing system. However, the number of network printers is not limited to two and one to several client computers may be provided.

The network printers 105 and 106 may be realized by a printing device performing printing in various formats including a laser beam printer, an ink jet printer, or a digital multifunction peripheral.

The network 107 connects the client computers 102-104, the print server 101 and the network printers 105 and 106 to enable mutual communication therebetween. The network 107 for example is realized using the Internet or a local area network (LAN).

Figure 2:
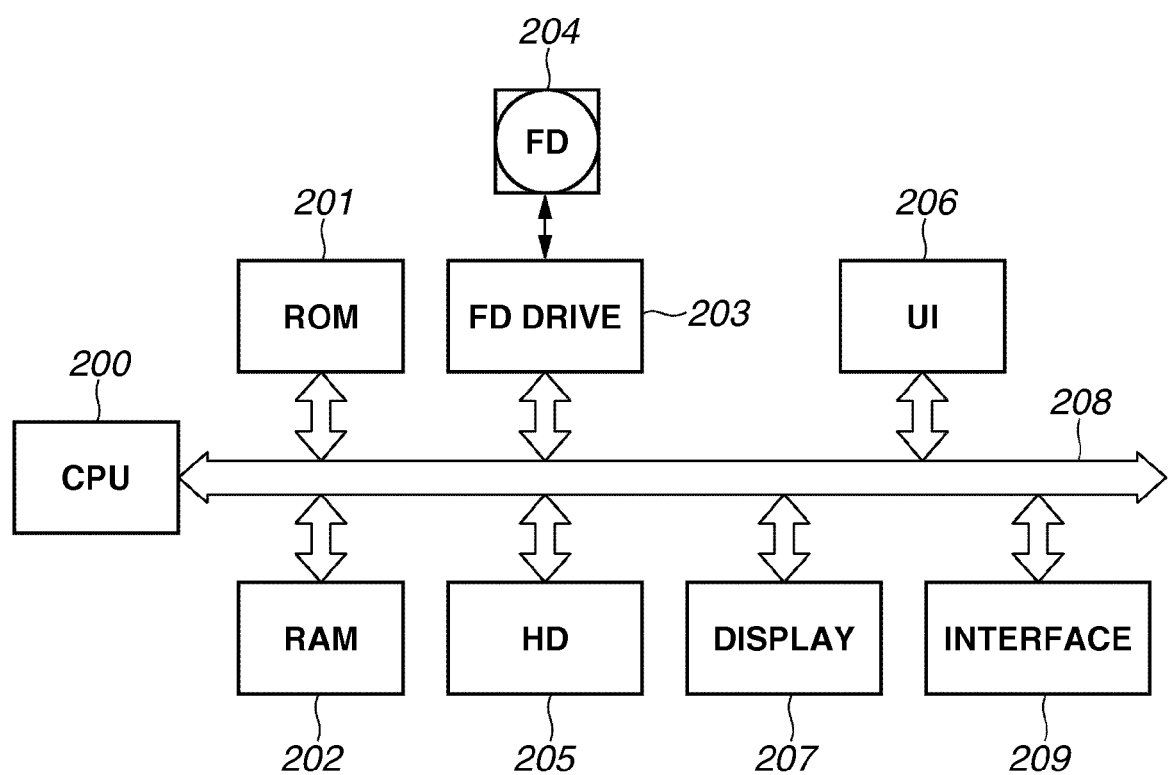
FIG. 2 is a block diagram illustrating an example of a configuration of hardware in an information processing apparatus capable of use as a print server, and a client computer according to an exemplary embodiment of the present invention.

FIG. 2 is a block diagram illustrating an example of a configuration of hardware in an information processing apparatus capable of use as the print server 101 and the client computers 102-104.

The print server 101 and the client computers 102-104 can be realized by an information processing apparatus having similar hardware functions.

In FIG. 2, a central processing unit (CPU) 200 is a control unit for the information processing apparatus. The CPU 200 implements programs stored in a hard disk (HD) 205 or the like. Programs implemented by the CPU 200 include for example application programs, printer driver programs, operating system (OS) programs and network printer control programs. When the CPU 200 implements programs, the file or information required for implementation of the program is stored temporarily in a random access memory (RAM) 202.

The ROM 201 is a storage medium storing various types of data including font data or template data used during document processing, or programs including basic input/output (I/O) programs. The RAM 202 is a storage medium temporarily storing data and functioning as a main memory or work area for the CPU 200.

The flexible disk (FD) drive 203 is used for loading programs stored in the flexible disk (FD) 204 as a storage medium into the information processing apparatus. The storage medium is not limited to an FD. Instead of an FD, other types of storage medium may be used and include CD-ROMs, CD-Rs, CD-RWs, PC cards, DVDs, IC (integrated circuit) memory cards, magneto-optical discs (MO), and memory sticks.

A hard disk (HD) 205 is a type of external storage device and functions as a high capacity memory. The HD 205 stores application programs, printer driver programs, OS, network printer control programs, and associated programs. A spooler is stored in the HD 205. The term "spooler" refers to a client spooler in the client computers 102-104 and to a server spooler in the print server 101. The HD 205 in the print server 101 also stores a table configured to control printing sequence operations or print job information received from the client computers 102-104.

A user interface (UI) 206 is configured to perform input of user orders. More specifically, the UI 206 is provided with a keyboard or a mouse. A user uses the keyboard or the mouse provided in the UI 206 to input commands including control commands for the network printers 105 and 106 to the information processing apparatus (client computer 102-104 and the print server 101).

A display 207 displays control commands input from the UI 206 or the state of the network printers 105 and 106. The display 207 may be realized for example by a liquid crystal display (LCD). The system bus 208 is a transmission path for data in the information processing apparatus (client computers 102-104, print server 101).

The interface 209 connects the information processing apparatuses (client computers 102-104, print server 101) to the network 107. The information processing apparatus (client computers 102-104, print server 101) can process data with external devices via the interface 209.

Figure 3:
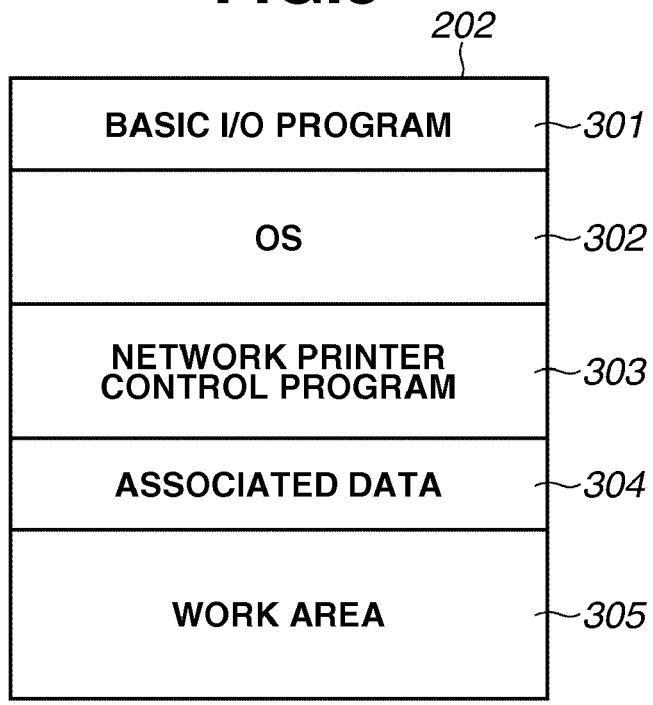
FIG. 3 illustrates an example of a memory map of a random access memory (RAM) according to an exemplary embodiment of the present invention.

FIG. 3 illustrates an example of a memory map of the RAM 202 illustrated in FIG. 2.

Network printer control programs stored in the FD 204 are loaded onto the RAM 202 for implementation. FIG. 3 illustrates the state of the memory map in which the programs can be implemented.

In FIG. 3, the basic I/O program 301 includes programs having initial program loading (IPL) functions of loading an OS from the HD 205 to the RAM 202 when the power source of the information processing apparatus is placed in the ON position to initiate OS operation. The OS 302, the network printer control program 303 and associated data 304 are stored in respective dedicated regions in the RAM 202. The work area 305 is an operating region used when the CPU 200 implements network printer control programs 303 or the like.

Although the present exemplary embodiment illustrates an example in which network printer control programs and associated data are loaded for implementation from the FD 204 directly to the RAM 202, this configuration is not always necessary and for example, the network printer control programs may be loaded onto the RAM 202 from the HD 205 in which network printer control programs are already installed.

The storage medium storing the network printer control programs 303 is not limited to the FD 204 and may be realized for example by a CD-ROM, CD-R, PC card, DVD, or IC memory card. Furthermore, the network printer control programs 303 are stored in the ROM 201 and configured to form part of the memory map and therefore enable the CPU 200 to directly implement the network printer control programs 303.

Software implementing functions equivalent to each of the devices above may be configured in placed of the hardware devices.

In the following description, the term "network printer control programs 303" is abbreviated as required to printer control program 303. Printer control programs 303 include programs configured to control a change to the printing destination of a print job or a change to a printing sequence. The printer control programs 303 include programs configured to change settings or control the sequence of print jobs and perform notification of printing destination change requests and printing termination for print jobs.

The printer control programs 303 performing this type of control may be divided into modules installed in the print server 101 and modules installed in the client computers 102-104. However, use of a single printer control program 303 configured to perform both client and print server functions may be enabled with reference to the implementation environment. Furthermore, a module having client functions and a module having print server functions may be installed together as printer control programs 303 in a single information processing apparatus and may be operated in pseudo-parallel either simultaneously or in a time-division format. In the present exemplary embodiment, a similar printer control program 303 is loaded into the client computers 102-104 and the print server 101.

Figure 4:
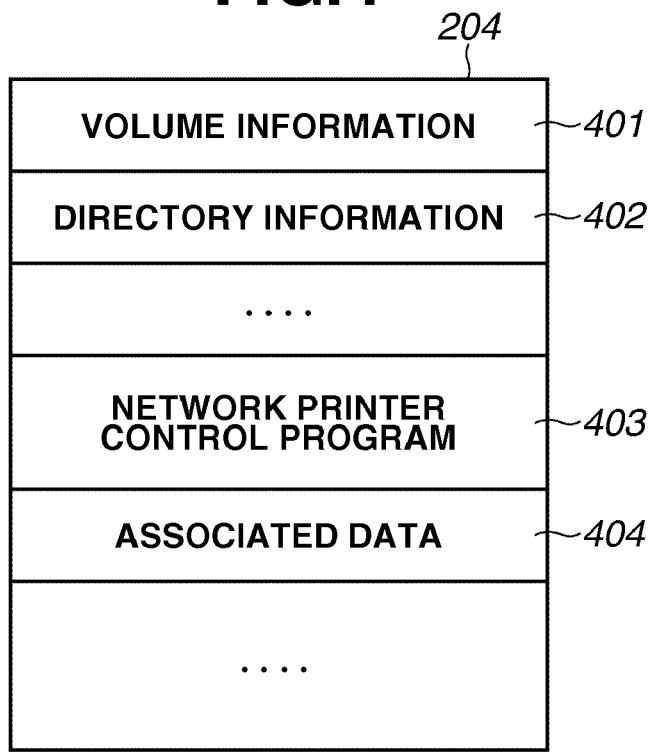
FIG. 4 illustrates an example of a memory map of a flexible disk (FD) according to an exemplary embodiment of the present invention.

FIG. 4 illustrates an example of a memory map of the FD 204 as illustrated in FIG. 2.

In FIG. 4, the FD 204 includes volume information 401 indicating data information, directory information 402, printer control programs 403 loaded to the RAM 202 as illustrated in FIG. 3 and associated data 404 for the printer control program 403. The printer control program 403 is configured to be programmed with reference to the time chart or the flowchart described in the present exemplary embodiment. The printer control program 403 stored in the FD 204 is loaded into the RAM 202 as a printer control program 303 as illustrated in FIG. 3. As described above, in the present exemplary embodiment, a similar printer control program 403 is loaded into the RAM 202 in the client computer 102-104 and the print server 101.

Figure 5:
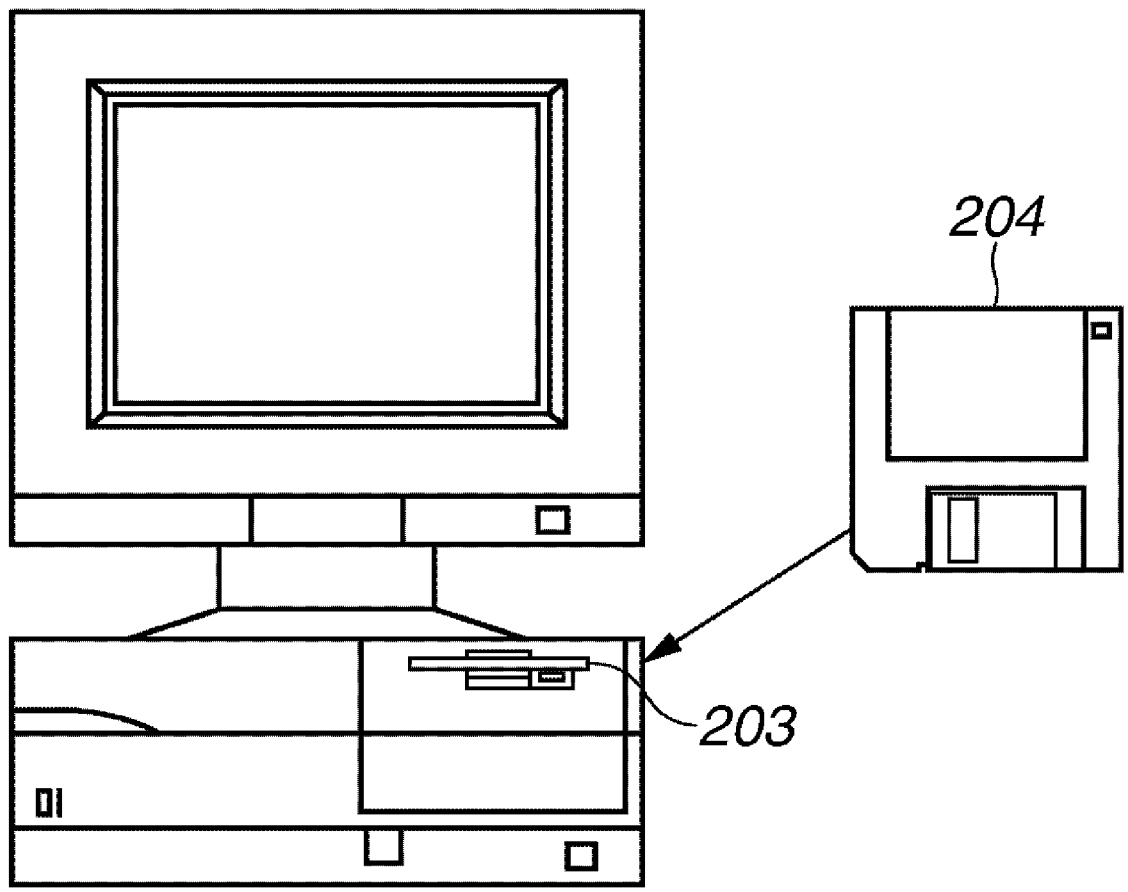
FIG. 5 illustrates an example of the relationship between an FD drive and an FD inserted into an FD drive according to an exemplary embodiment of the present invention.

FIG. 5 illustrates an example of the relationship between the FD drive 203 and the FD 204 inserted into the FD drive 203. In FIG. 5, the printer control program 403, which is configured to be programmed with reference to the time chart or the flowchart in the present exemplary embodiment, and associated data 404 therefor are stored in the FD 204.

Figure 6:
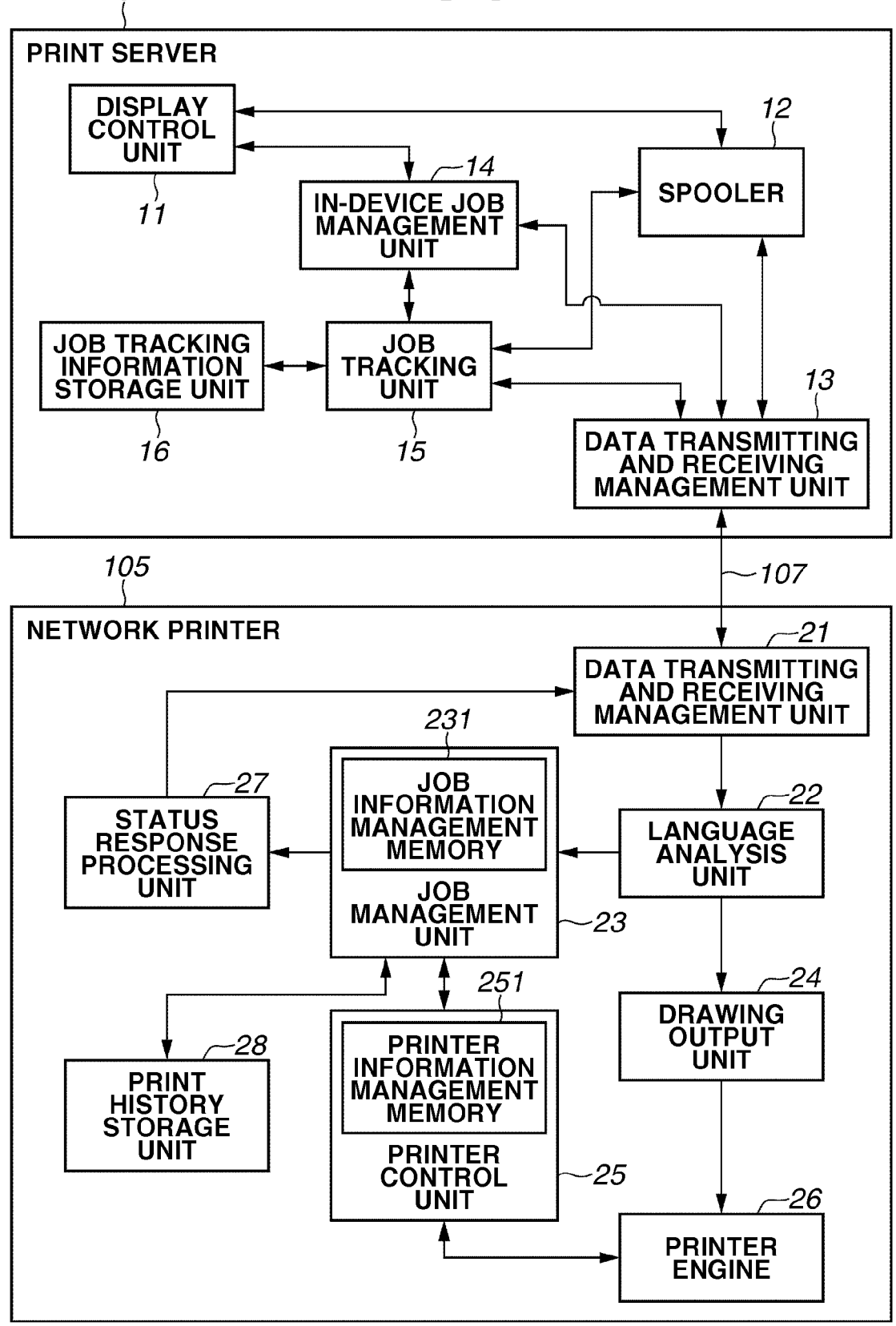
FIG. 6 is a block diagram illustrating an example of a mechanical configuration of a print server and a network printer according to an exemplary embodiment of the present invention.

FIG. 6 is a block diagram illustrating an example of a mechanical configuration of the print server 101 and the network printer 105. Herein, an example will be described in which the print server 101 operates as a host computer. Furthermore, the network printer 106 may be used in place of the network printer 105.

The display 207 of the display unit 11 provided in the print server 101 is configured to display a list of print jobs in the network printer 105 or a list of print jobs in the spooler 12. The display unit 11 has the function of a graphical user interface (GUI) for implementing print jobs.

Figures 8, 9:
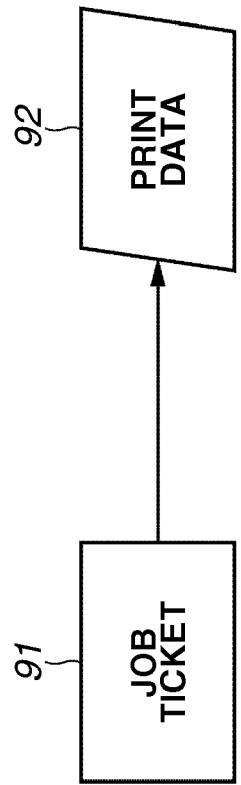
FIG. 8 illustrates an example of a state of a job tracking information table at a certain time point according to an exemplary embodiment of the present invention.
FIG. 9 illustrates an example of data for a print job according to an exemplary embodiment of the present invention.

The spooler 12 is configured to receive external programs (not illustrated) or print jobs. The spooler 12 transmits received external programs or print jobs in sequence to the network printer 105 via the data transmitting and receiving management unit 13. The spooler 12 has the function of assigning a job tracking ID issued by a job tracking unit 15 to a job ticket 91 as illustrated in FIG. 9 when transmitting a print job to the network printer 105. As described above, the order for implementation of the print job is directed with reference to user operations performed on the GUI displayed on the display unit 11.

The data transmitting and receiving management unit 13 has the function of sending and receiving transmitted data to the network printer 105 and received data from the network printer 105 via the network 107.

The in-device job management unit 14 has the function of acquiring and caching print jobs in the network printer 105 supplying the print jobs to the display 11. The in-device job management unit 14 has the function of receiving orders based on user operations with respect to the GUI displayed on the display unit 11 and transmitting control commands such as cancellation or suspension of a print job to the network printer 105 via the data transmitting and receiving management unit 13.

The job tracking unit 15 tracks the processing state from the spooler 12 of a print job cached by the in-device job management unit 14 or a print job implemented (printed) by the network printer 105. Detailed description of the job tracking unit 15 will be made with reference to FIG. 7. A job tracking information storage unit 16 stores information related to a print job tracked by the job tracking unit 15. In the present exemplary embodiment, the job tracking information storage unit 16 is configured using a non-volatile storage medium. In this manner, even after the printer control program 303 is activated, the job tracking unit 15 can track a print job using pre-acquired information related to the print job.

The data transmitting and receiving management unit 21 provided in the network printer 105 has the function of sending and receiving sent data to the network printer 105 and received data from the network printer 105 via the network 107. The data transmitting and receiving management unit 21, for example, receives and manages the attribution of print jobs and data for print jobs from the print server 101.

A language analysis unit 22 analyzes the contents of print job data in detail, decodes the printing command, and implements control commands related to the management or drawing output of the print job according to the print command. More specifically, the language analysis unit 22 receives a group of control commands respectively in sequence from a receiving buffer in the data transmitting and receiving management unit 21, checks the contents with reference to a stated rule in the printer control language, and determines which processing operations are requested by that control command. When it is determined that the control command is a command related to the print job, or is a command related to the attribution of the print job, the language analysis unit 22 issues a management command for the relevant print job to the job management unit 23. A command related to the print job, for example, is a start declaration or an end declaration for the print job. A command related to the attribution of the print job is, for example, paper size, number of sheets of paper, or stapling.

Furthermore, when the control command orders a drawing output such as text, graphics, or images, the language analysis unit 22 performs the drawing output command based on the relevant print job with respect to the drawing output unit 24.

The job management unit 23 manages the attribution of the print job sent from the printer server 101 with reference to a schedule prepared in the unit of a print job according to the management command for the print job from the language analysis unit 22.

The job management unit 23 is provided with a job information management memory 231. A job management table described hereafter is provided in the job information management memory 231. The job management unit 23 uses the job management table to perform control on the unit job. The information recorded in the job management table is initially generated by the start command for the print job and is confirmed with the end command for the print job.

The job management unit 23 can vary the information recorded in the job management table based on orders from the print server 101 or data for succeeding print jobs irrespective of whether an end command for the print job has been received. More specifically, the job management unit 23 can vary the attribution of the print job, vary the priority order of the schedule (print sequence), or cancel the printing (delete the data for the print job).

The job management unit 23 issues a selection command for the paper to be used or the paper feed cartridge (printer control command) according to the attribution of the print job to be implemented. Furthermore, the job management unit 23 constantly monitors the condition of the current print job by acquiring the state of the network printer 105 via the printer control unit 25. When predetermined conditions are satisfied, for example, when an error has occurred, the job management unit 23 outputs a status response request order to a status response processing unit 27.

The drawing output unit 24 has the function of drawing, rasterizing, and outputting text, graphics, or images related to the print output. For example, the drawing output unit 24 performs operations including preparing a corresponding character pattern, rasterizing the image data, or calculating graphics according to the drawing output command from the language analysis unit 22, and then sends the data to the printer engine 26 after rasterizing the printing data into a data format adapted for output.

The printer engine 26 performs print output processing using a method such as an electrophotographic method to actually form an image on the paper surface according to the printing data (output rasterized data) converted into a data format adapted for output by the drawing output unit 24.

The printer engine 26 has a residual amount detection unit for recording sheets, and when the paper is not set, the printer engine 26 constantly sends a warning signal to the printer control unit 25. When the paper runs out during rasterizing or print processing, the printer engine 26 stops the recording unit, such as a printer drum, and sends an error signal to the printer control unit 25 using a method such as interrupt.

The printer control unit 25 has the function of performing operations such as selecting the paper to be used and initializing the network printer 105 and controlling the network printer 105 according to the printer control commands from the job management unit 23. Furthermore, the printer control unit 25 has the function of constantly monitoring the overall state of the network printer 105 including the state of the paper feed cassette, the door opening condition, and level of toner, and notifying the state of the network printer 105 to other components as required.

The latest state of the network printer 105 including the residual amount of paper and error condition is stored in a printer information management memory 251 provided in the printer control unit 25.

According to the status response request command received from the job management unit 23, the status response processing unit 27 prepares status response information by converting a status notification expressed in the internal format of the network printer 105 into an external expression format comprehensible to the printer server 101. The status response processing unit 27 sends the resulting status response information to the data transmitting and receiving management unit 21.

When status response information is received from the status response management unit 27, the data transmitting and receiving management unit 21 temporarily saves the status response information to a sending buffer and then resends the saved status response information to the printer server 101 via the network 107.

Figure 7:
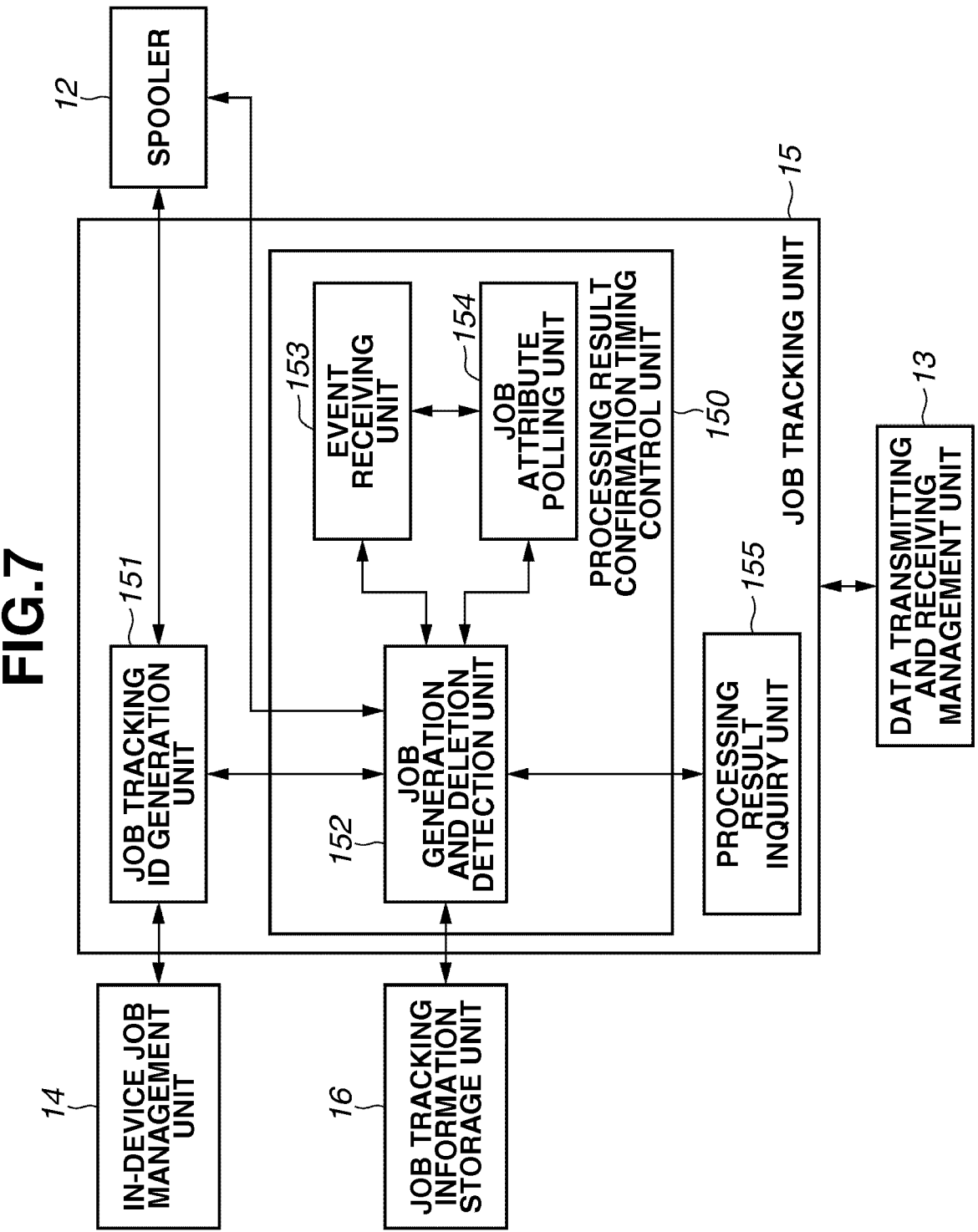
FIG. 7 is a block diagram illustrating an example of a detailed configuration of a job tracking unit according to an exemplary embodiment of the present invention.

FIG. 7 is a block diagram illustrating an example of a detailed configuration of the job tracking unit 15.

In FIG. 7, a job tracking ID generation unit 151 generates a unique ID configured to track a print job state when a print job is sent from the spooler 12 or when printing of a print job cached by the in-device job management unit 14 is implemented. In the following description, this ID is referred to as a "job tracking ID". In the present exemplary embodiment, a universally unique identifier (UUID) is used as an example of a job tracking ID.

A job generation and deletion detection unit 152 uses a job tracking information table stored in the job tracking information storage unit 16 to manage job tracking IDs received from the job tracking ID generation unit 151. The job generation and deletion detection unit 152 receives information from an event receiving unit 153, a job attribute polling unit 154, and the spooler 12. In this manner, the job generation and deletion detection unit 152 uses the information to monitor whether a print job having a job tracking ID generated by the job tracking ID generation unit 151 has been generated in the network printer 105, and whether the print processing has been completed and deleted.

The event receiving unit 153 receives event information from the network printer 105 via the data transmitting and receiving management unit 13. Furthermore, the event receiving unit 153 receives event information generated in the print server 101. The event information includes events related to a job state change indicating a change to the print job state or timer events indicating activation of the timer.

The job attribute polling unit 154 applies polling processing to acquire print job information (for example, an attribute).

In the present exemplary embodiment, a processing result confirmation timing control unit 150, which controls a timing for confirmation of a processing result in the network printer 105, is configured using the job generation and deletion detection unit 152, the event receiving unit 153, and the job attribute polling unit 154.

A processing result inquiry unit 155 has the function of using commands described hereafter to make an inquiry regarding a print job processing result when it is detected that the job generation and deletion detection unit 152 has deleted the print job subject to the confirmation.

FIG. 8 illustrates an example of a state of a job tracking information table at a certain time point. The job tracking information table is stored in the job tracking information storage unit 16.

The job tracking information table illustrated in FIG. 8 uses the unique job ID 81 to manage various types of information in a table format. More specifically, such management includes a job tracking ID 82, an ID (in-device job ID) 83 in the network printer 105, a processing state (job state) 84 for a print job in the network printer 105, and an attribute of the print job (job attribute) 85. Two print jobs are tracked in the example illustrated in FIG. 8. Since the print job which has a job ID 81 of "2" of the two print jobs is not generated in the network printer 105, there are no corresponding entries for the in-device job ID 83 and the job state 84. The details of the job tracking information management table may be varied by processing (the job generation and deletion detection unit 152) performed by the network printer control program 403.

FIG. 9 illustrates an example of data for a print job used in the print processing system according to the present exemplary embodiment.

The print job data in FIG. 9 includes a job ticket 91 storing print settings and printing data 92 such as a data file (DF) or postscript (PS) file. The details of the job ticket 91 are used to check the position of the print data. The job ticket 91 may, for example, be based on a job definition format (JDF).

FIG. 10 illustrates an example of the job ticket 91. In addition to printing attributes 1005 such as the number of copies to print, the paper size, and the job name, the job ticket 91 illustrated in FIG. 10 includes a job ID 1001 and the job tracking ID 1002 described above for identification and management of the print job by the network printer control program 403.

The total number of pages is a type of print attribute and includes situations in which rasterizing of the print data 92 is not confirmed and in which it is unclear. Furthermore, the job ticket 91 in the present exemplary embodiment may enable exceptional settings (exception settings) in which a page range is identified. In the example illustrated in FIG. 10, a paper type "thick paper" is specified with respect to pages 1-2 and a similar setting of "thick paper" is specified with respect to pages 23-24. The paper type "thick paper" in the exception setting is used for pages subject to an exception setting in substitution for the overall paper type "plain paper" set for the print job. A plurality of types of print attributes covered by exception settings may be set to enable respective application of print attributes covered by the exception settings. Furthermore, print attributes for pages not specified by an exception setting use the print attribute 1005a for the overall print job.

FIG. 11 illustrates an example of a job management table stored in the job information management memory 231 illustrated in FIG. 6.

FIG. 11 illustrates an example in which a print job is stored in the job tracking information table illustrated in FIG. 8. FIG. 11 describes an example in which there is a print job stored in the job tracking information table in FIG. 8.

The job management table illustrated in FIG. 11 enables management of information such as the job state 1104 and the reception number 1101 together with information extracted from the job ticket 91 described above (the job tracking ID 1102, the in-device job ID 1103 and the job attribute 1105). FIG. 11 illustrates the state occurring immediately after a print job of the in-device job ID "0x11181" is received according to a processing sequence illustrated in FIG. 12.

Figure 12:
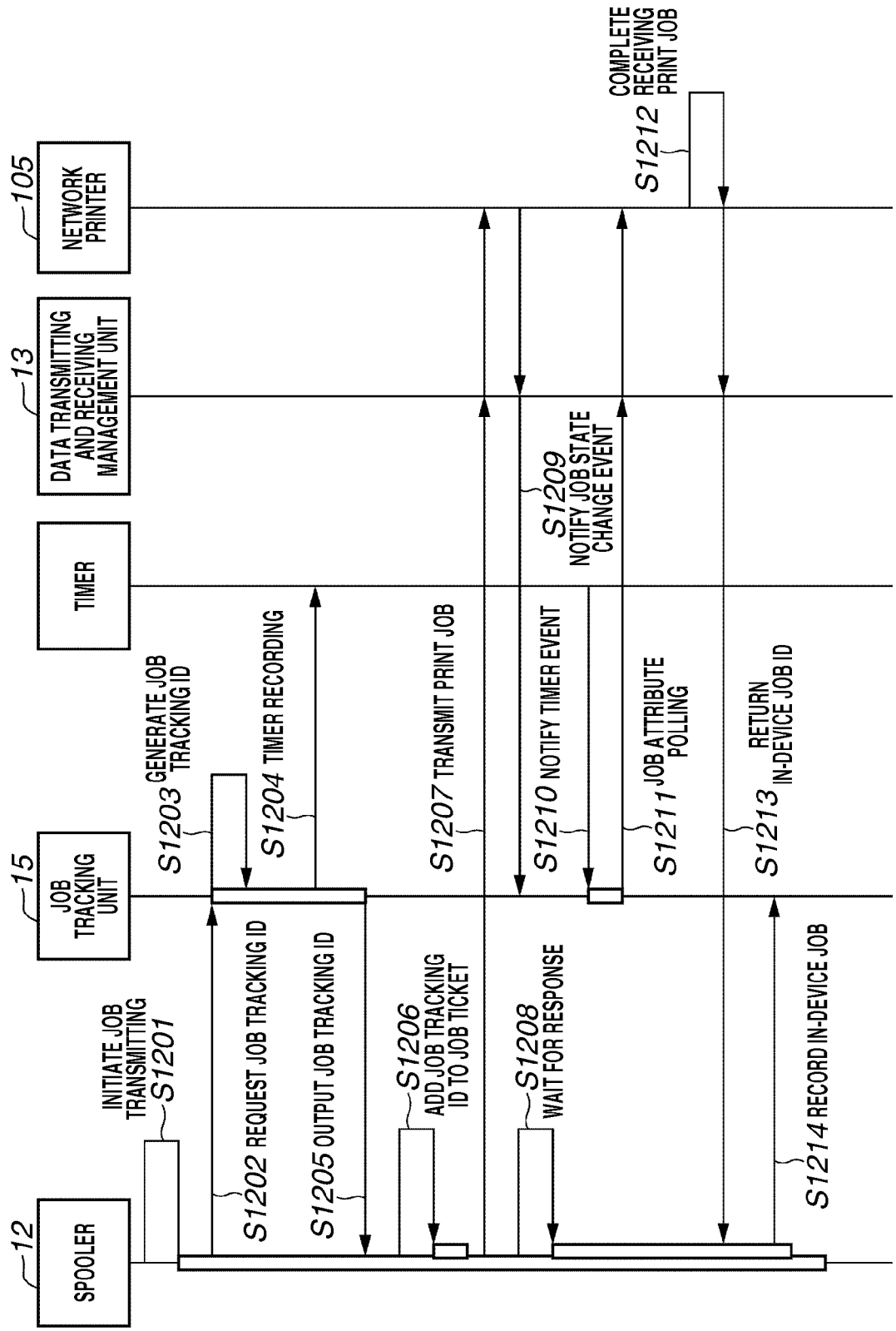
FIG. 12 illustrates a sequence of processing procedures in a print processing system when transmitting a print job from a print server to a network printer according to an exemplary embodiment of the present invention.

FIG. 12 illustrates an example of a sequence of processing procedures in a print processing system when transmitting a print job from the print server 101 to the network printer 105 using processing of the network printer control program 303 loaded into the print server 101.

Firstly in step S1201, the spooler 12 initiates a transmitting process for the print job. In this manner, in step S1202, the spooler 12 orders the job tracking unit 15 to generate a job tracking ID. Next in step S1203, the job tracking unit 15 generates a job tracking ID (UUID). Then in step S1204, the job tracking unit 15 generates a timer event for initiating a tracking process for the print job (records (sets) a predetermined value to a timer provided in the print server 101). Then in step S1205, the job tracking unit 15 outputs the job tracking ID generated in step S1203 to the spooler 12.

The spooler 12 receives the job tracking ID and, then in step S1206, sets (assigns) the received job tracking ID as a job tracking ID 1002 for the job ticket 91 described above. Then in step S1207, the spooler 12 sends the print job including the job ticket 91 and print data 92 set in the job tracking ID in step S1206 to the network printer 105. In step S1208, the spooler 12 is in stand-by mode until a response is received from the network printer 105.

In step S1209, when the print job is received, the network printer 105 generates the print job, and notifies the job tracking unit 15 of any job state change events indicating a change in the print job. The event receiving unit 153 illustrated in FIG. 7 outputs a job state change event to the job generation and deletion detection unit 152. The job generation and deletion detection unit 152 updates the job tracking information table illustrated in FIG. 8 based on the job change event output from the event receiving unit 153. The job generation and deletion detection unit 152 detects the generation of a print job by receiving the job state change event data.

Then in step S1210, the event receiving unit 153 in the job tracking unit 15 receives a notification of a timer event when the set time has elapsed in the timer provided in the print server 101. In step S1211, the job attribute polling unit 154 performs a polling process for the print job with respect to the network printer 105, which is the transmission destination for the print job sent from the spooler 12 in step S1207. In this manner, the job attribute polling unit 154 acquires information (for example attributes) of the print job specified with the job tracking ID set in step S1206. The job generation and deletion detection unit 152 updates the job tracking information table illustrated in FIG. 8 based on the information for the print job acquired by the job attribute polling unit 154.

Then in step S1212, the network printer 105 is in stand-by mode until completion of the reception processing for the print job. When processing of receiving the print job is completed, in step S1213, the network printer 105 sends the job ID generated in the network printer 105 to the spooler 12. This ID for example may be an in-device job ID "0X11181" as illustrated in FIG. 11.

In step S1214, upon receiving the in-device job ID, the spooler 12 outputs the in-device job ID to the job generation and deletion detection unit 152. The job generation and deletion detection unit 152 records the in-device job ID output from the spooler 12 in the job tracking information table illustrated in FIG. 8. The job generation and deletion detection unit 152, for example, sets the in-device job ID "0X11181" as the in-device job ID 83 having a job ID of "2" in FIG. 8.

Figure 13:
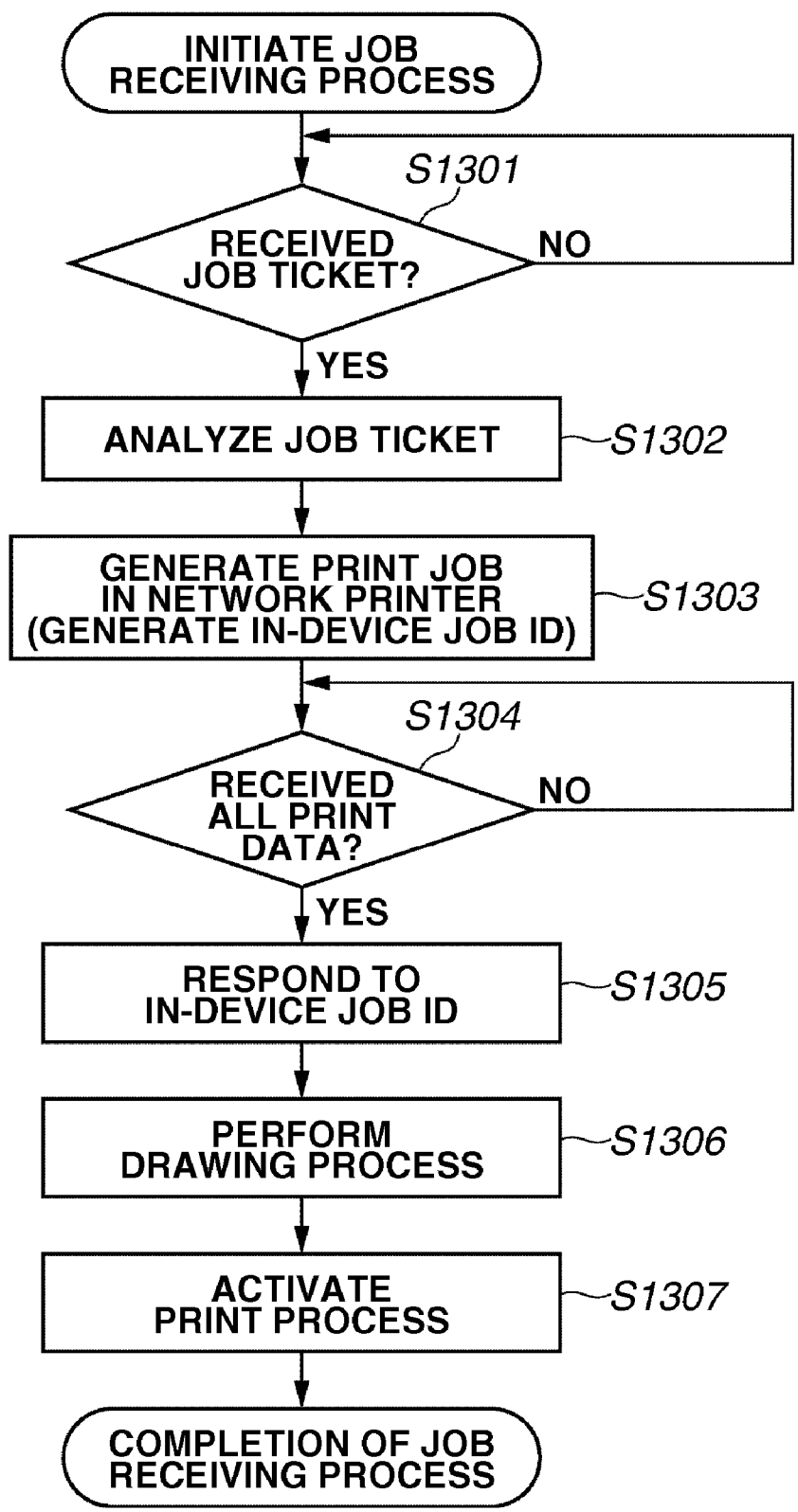
FIG. 13 is a flowchart illustrating an example of processing for receiving a print job in a network printer according to an exemplary embodiment of the present invention.

FIG. 13 is a flowchart illustrating an example of processing for receiving a print job in the network printer 105. In step S1301, the data transmitting and receiving management unit 21 is in stand-by mode until receiving the job ticket 91. When the job ticket 91 is received, processing proceeds to step S1302. In step S1302, the language analysis unit 22 analyzes the job ticket 91 received in step S1301. Then in step S1303, the job management unit 23 generates a new print job. For example, the job management unit 23 generates a print job having an in-device job ID of "0X11181" as illustrated in FIG. 11. In this manner, an in-device job ID is generated in step S1303.

As described above, when a print job is generated in the network printer 105, the status response processing unit 27 generates a job state change event indicating that the state of the print job has changed. The data transmitting and receiving management unit 21 sends the job state change event generated by the status response management unit 7 to the spooler 12, which is the transmission source of the job ticket 91 received in step S1301.

Then in step S1304, the data transmitting and receiving management unit 21 is in stand-by mode until receipt of all the print data 92. When all of the print data 92 is received, the processing proceeds to step S1305. In step S1305, the data transmitting and receiving management unit 21 sends the in-device job ID (for example, "0x11181" generated in step S1303) to the spooler 12. The processing in step S1304 is a processing operation corresponding to step S1213 illustrated in FIG. 12.

Next in step S1306, the drawing output unit 24 performs drawing processing using the job ticket 91 received in step S1301 and the print data 92 received in step S1304. In step S1307, the printer engine 26 implements print processing using the results of the drawing processing performed in step S1306 to form an image on the paper surface. The drawing processing in step S1306 and the print processing in step S1307 are respectively queued and are placed in a stand-by mode when a prior print job is present.

Figure 14:
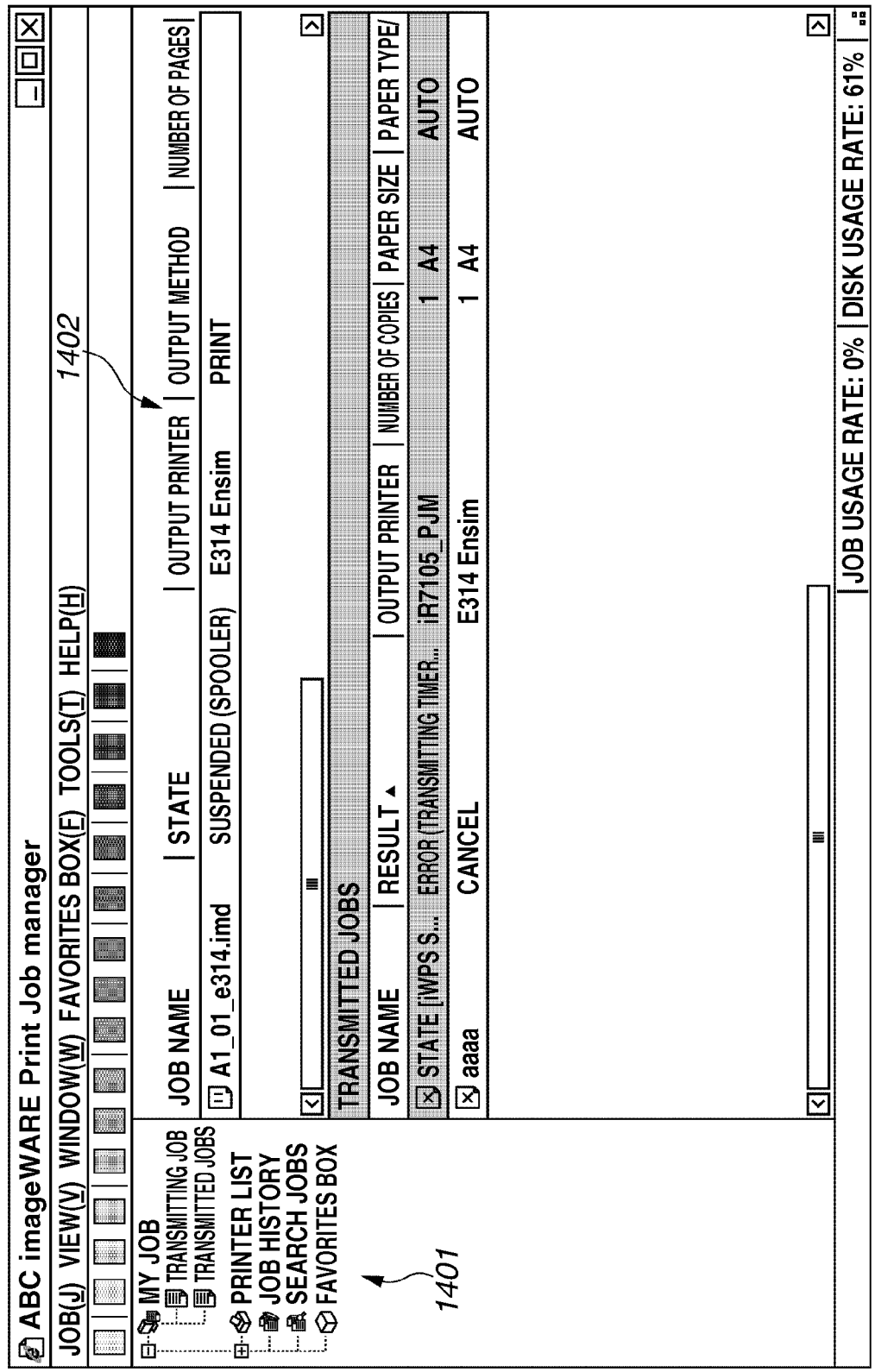
FIG. 14 illustrates an example of a graphical user interface (GUI) displayed on a display by a display unit provided in a print server according to an exemplary embodiment of the present invention.

FIG. 14 illustrates an example of a graphical user interface (GUI) displayed on the display 207 by the display unit 11 provided in the print server 101.

A plurality of network printers is displayed in the tree unit 1401 in the GUI 1400 illustrated in FIG. 14. A user may select a network printer to be displayed by selecting a network printer displayed in the tree unit 1401. The job list 1402 can display a list of print jobs currently being processed. Furthermore, the job list 1402 can display a list of print jobs that have been sent to the network printer and completed.

Figure 15:
FIG. 15 illustrates an example of a screen configured to confirm and edit a job ticket for a print job selected by a user on the GUI illustrated in FIG. 14 according to an exemplary embodiment of the present invention.

FIG. 15 illustrates an example of a screen for confirming and editing a job ticket 91 for a print job selected by a user in the GUI 1400 illustrated in FIG. 14. The screen 1500 in FIG. 15 includes drop-down list boxes and a plurality of buttons for displaying and changing the items 1005 included in the job ticket 91. The button 1501 is a button for opening a dialog window to change the paper type of the items in the job ticket 91.

FIG. 16 illustrates an example of a dialog window displayed by a user pressing a button 1501. In FIG. 16, a list of paper types that can be used in the currently selected network printer is displayed on the dialog window 1600. The user can change the paper type in the job ticket 91 to a paper type corresponding to the selected item by selecting an item in the list.

Figure 17:
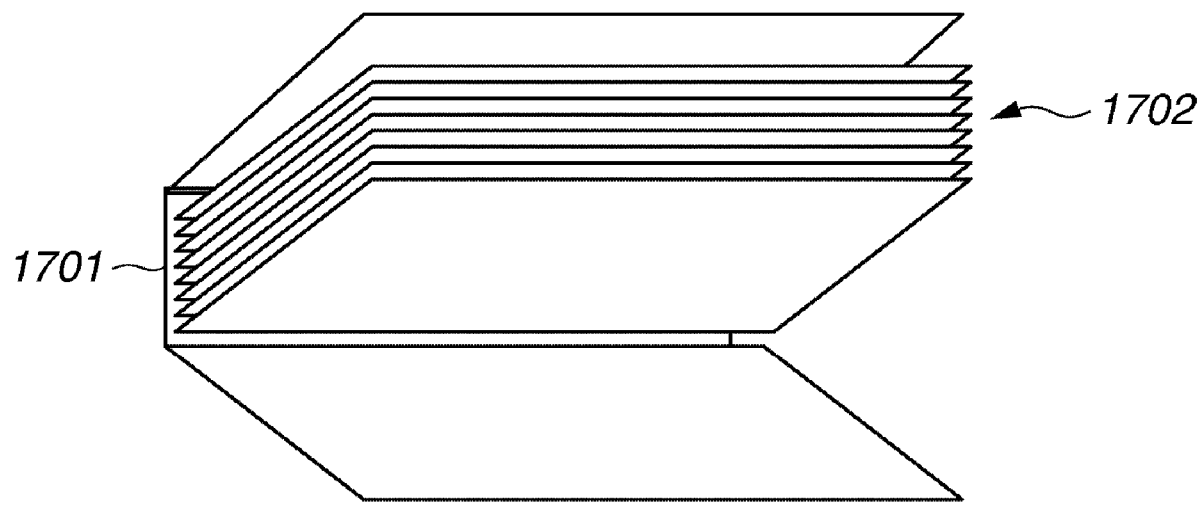
FIG. 17 schematically illustrates an example of an output product prepared using side-stitching bookbinding according to an exemplary embodiment of the present invention.

FIG. 17 schematically illustrates an example of an output product prepared using side-stitching bookbinding. Side-stitch bookbinding is a method of binding in which glue is applied to a sealed section of a stack of sheets of paper used in the bookblock (hereafter referred to as the "bookblock") and bound to the spine. As a result, the width of the spine 1701 is determined to be the length obtained by adding a small amount of the thickness of glue to the thickness of the bookblock 1702.

Figure 18:
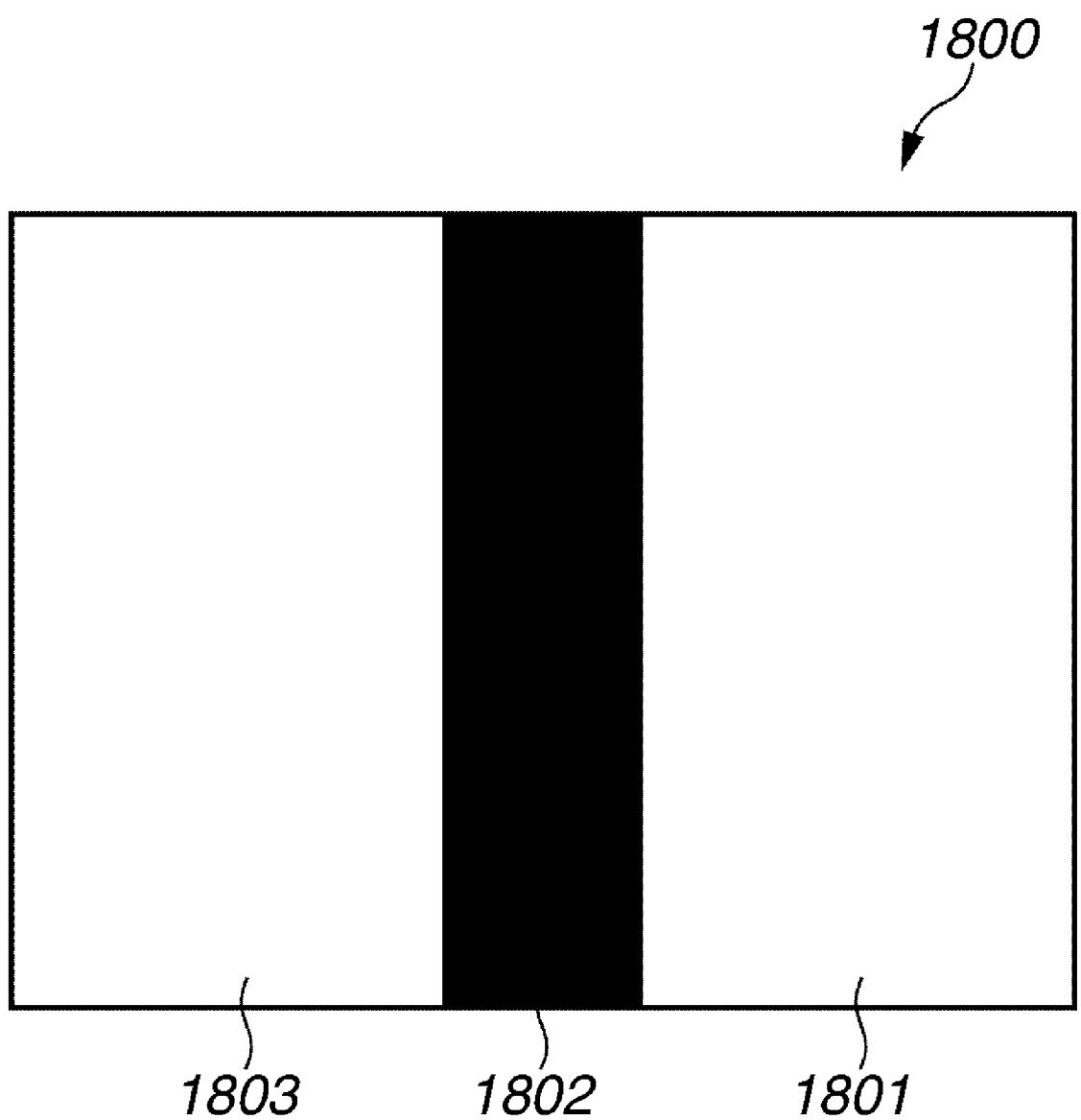
FIG. 18 is a conceptual illustration of an example of a spine according to an exemplary embodiment of the present invention.

FIG. 18 is a conceptual illustration of an example of a spine. In FIG. 18, paper 1800 is broadly divided into the three parts of a front cover 1801, a spine 1802, and a back cover 1803. The requirement for the width of the spine 1802 to match the thickness of the bookblock 1702 will be described with reference to FIGS. 19A, 19B, and 19C.

Figure 19A:
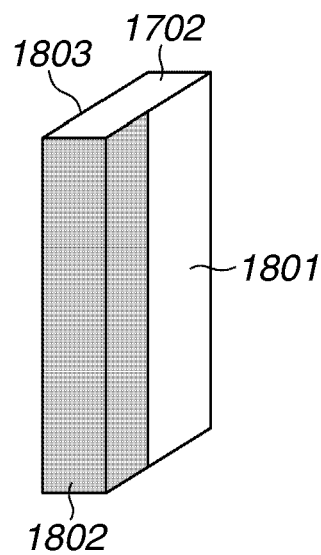
FIGS. 19A, 19B, and 19C illustrate an example of the relationship between the width of the spine and the thickness of the bookblock according to an exemplary embodiment of the present invention.
Figure 19B:
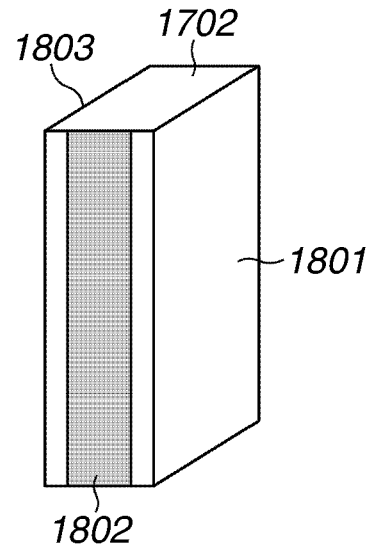
Figure 19C:
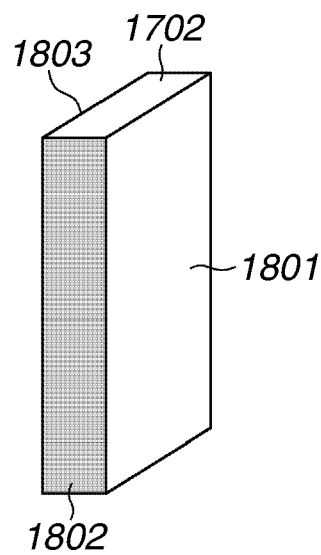

FIGS. 19A, 19B, and 19C illustrate an example of the relationship between the width of the spine and the thickness of bookblock. More specifically, FIG. 19A illustrates an example of an output product produced using side-stitching bookbinding in which the width of the spine 1802 is greater than the thickness of the bookblock 1702. In FIG. 19A, since the width of the spine 1802, which is illustrated in gray, is wider than the thickness of the bookblock 1702, respective parts of the spine 1802 extend over the front cover 1801 and the back cover 1803.

In contrast to FIG. 19A, FIG. 19B illustrates an example of an output product produced using side-stitching bookbinding in which the width of the spine 1802 is smaller than the thickness of the bookblock 1702. In FIG. 19B, since the width of the spine 1802, which is illustrated in gray, is narrower than the thickness of the bookblock 1702, respective parts of the front cover 1801 and the back cover 1803 extend over the spine 1802.

FIG. 19C illustrates an example of an output product produced using side-stitching bookbinding in which the width of the spine 1802 is equal to the thickness of the bookblock 1702. In FIG. 19C, since the spine 1802, which is illustrated in gray, is equal to the actual spine width, the spine 1802 matches the spine width of the output product.

Figure 20:
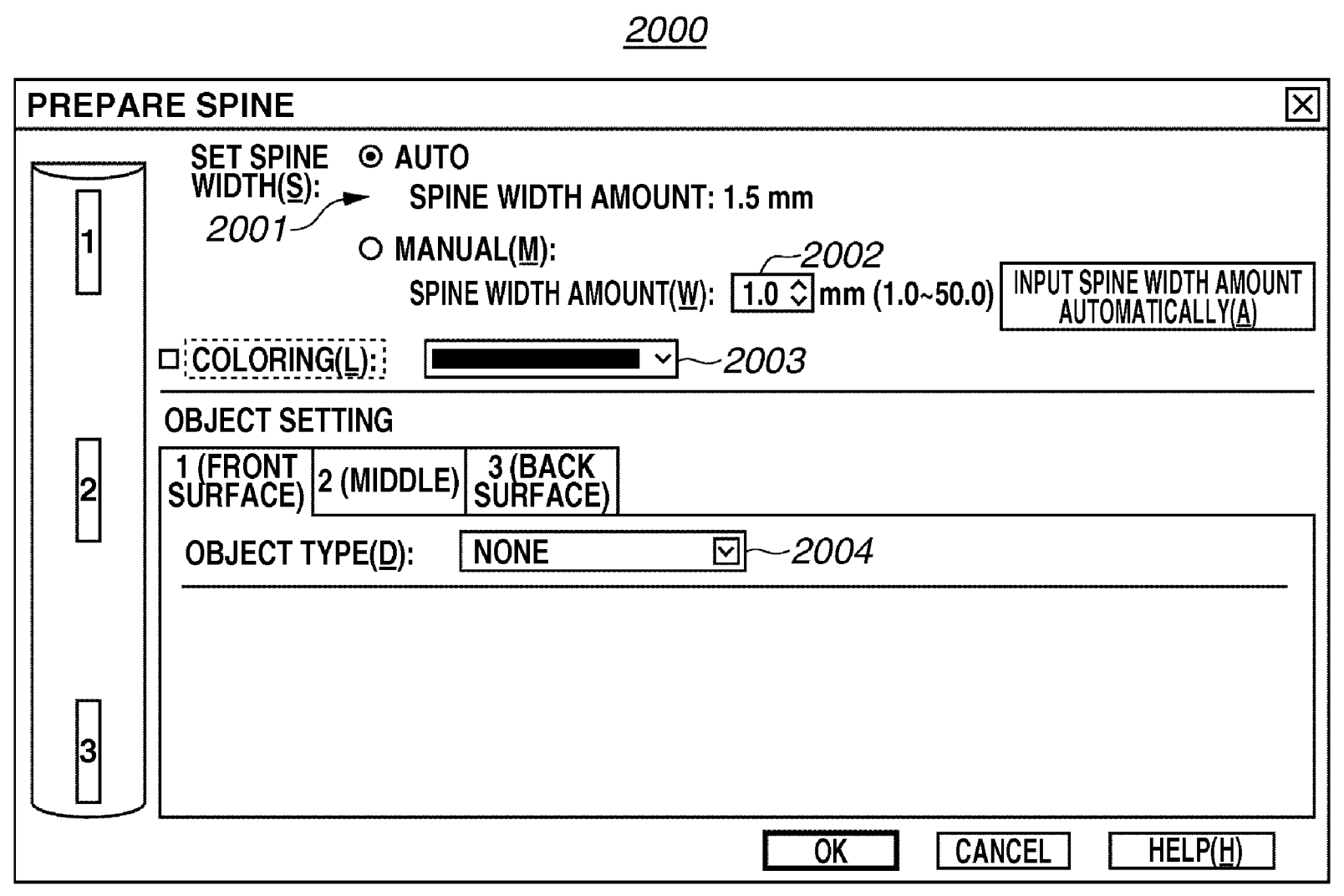

FIG. 20 illustrates an example of a GUI displayed on the display 207 by implementing an application for issuing a print job in the client computers 102-104. More specifically, FIG. 20 illustrates an example of a dialog window 2000 for setting the spine 1802.

The dialog window 2000 in FIG. 20 displays radio buttons 2001 for selecting a method of introducing the spine width and an edit box 2002 for inputting the spine width. The radio buttons 2001 enable switching between a mode in which the spine width is automatically determined and a mode in which the spine width is manually input. When using the mode of automatic determination of the spine width, the spine width can be calculated using information such as the paper type set for the bookblock 1702 and the number of sheets of paper. When using the mode of manually inputting the spine width, the width of the spine 1802 can be set to the width specified via the edit box 2002 without reference to the paper type of the bookblock 1702. Furthermore, the dialog window 2000 displays a pull-down menu 2003 for specifying presence or absence of coloring for the spine 1802 and the colors used in such coloring and an entry field 2004 for entering the type of an object to be printed on the spine 1802.

FIG. 21 illustrates an example of paper information registered in the network printer 105 and used in an application of the client computers 102-104 or the print server 101. Although an example is described herein in which the paper information is registered in the network printer 105, the paper information may be registered in the network printer 106.

In FIG. 21, the paper information 2100 includes attributes such as paper ID 2101, paper name 2102, grammage 2103, surface property 2104, shape 2105, color 2106, fabric orientation 2107, and glossiness adjustment 2108. The paper ID 2101 is stated in the job ticket 91 and the network printer 105 is used as a key for determining the paper type. The paper name 2102 is a character string displayed on the GUI and is used to display the left-most column in the list in the dialog window 1600 illustrated in FIG. 16.

The paper information 2100 is registered in the GUI displayed in a display (not illustrated) provided in the network printer 105. The registered paper information 2100 is transmitted to the print server 101 and the client computers 102-104 via the network 107. When the paper information 2100 is changed at the network printer 105, although there is a method of broadcasting the paper information 2100, such a method may result in unnecessary traffic. As a result, a method is generally used in which the paper information 2100 is acquired from the network printer 105 during user operations to acquire paper information in the client server 101 and client computers 102-104 which are required to share the paper information 2100.

FIG. 22 illustrates an example of a GUI for receiving a user operation triggering input of paper information 2100 from the network printer 105. Although an example is described herein in which the GUI is displayed on the display 207 of the client server 101, the GUI may be displayed on the display 207 of the client computers 102-104.

In FIG. 22, the dialog window 2200 is provided with a button 2201. When a user presses the button 2201, the print server 101 acquires paper information 2100 from the network printer 105 and stores the paper information 2100 in the RAM 202 or the HD 205. Until the button 2001 is pressed on a subsequent occasion, the paper information 2100 stored in the RAM 202 or the HD 205 may be re-used. The protocol used during communication may be a general-use protocol such as JMF or may be a system-specific protocol.

Figure 23:
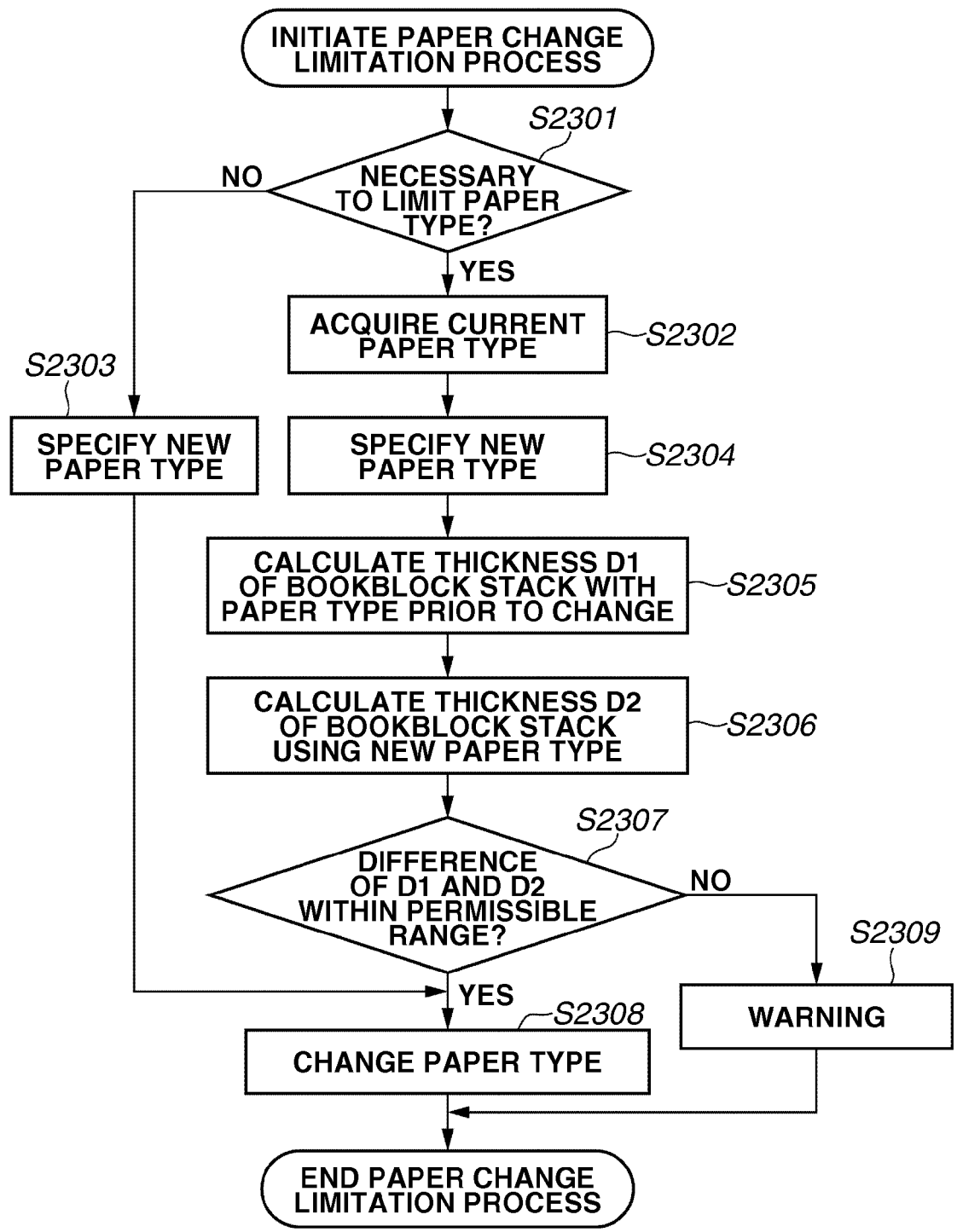
FIG. 23 is a flowchart illustrating an example of a print server process configured to use bookblock thickness to limit a change to paper type in the event that a user changes the paper type for a print job according to an exemplary embodiment of the present invention.

FIG. 23 is a flowchart illustrating an example of processing by the print server 101 when using the thickness of the bookblock 1702 to limit a change to a paper type in the event that a user changes the paper type for a print job. Although an example is described herein in which the print server 101 performs processing operations, these processing operations may be performed by the client computers 102-104 or the network printers 105 and 106.

In step S2301, the in-device job management unit 14 examines the job ticket 91 for the print job being processed and determines whether a limit on paper type is required for the settings for post-processing of a print product. More specifically, the in-device job management unit 14 determines whether the printing method set in the printing attributes 1005 is case binding. If it is determined that the printing method is case binding (YES in step S2301), the processing proceeds to step S2302. When the printing method is not case binding (NO in step S2301), the processing proceeds to step S2303. In step S2303, the display unit 11 displays a dialog window 1600 illustrated in FIG. 16 to allow the user to select a different paper type. Then, the processing proceeds to step S2308 described below.

In step S2302, the in-device job management unit 14 acquires the currently set paper type from the printing attributes 1005 in the job ticket 91. Then in step S2304, the display unit 11 displays a dialog window 1600 as illustrated in FIG. 16 to allow the user to select a different paper type. Then in step S2305, the in-device job management unit 14 calculates the thickness D1 of the bookblock 1702 required for printing with the paper type acquired in step S2302. Then in step S2306, the in-device job management unit 14 calculates the thickness D2 of the bookblock 1702 required for printing with the newly selected paper type in step S2304.

In step S2307, the in-device job management unit 14 compares the thicknesses D1 and D2 for the bookblock 1702 and determines whether the difference (of the absolute values) of those thicknesses is within a predetermined range of permissible values. When it is determined that the difference of thicknesses D1 and D2 of the bookblock 1702 is within the range of permissible values, the processing proceeds to a step S2308, and when the result of step S2307 is NO, the processing proceeds to step S2309.

In step S2308, the in-device job management unit 14 writes the new paper type selected by the user in step S2304 into the job ticket 91. On the other hand, when the processing proceeds to step S2309, the display unit 11 displays a warning screen to the effect that the difference of the thicknesses resulting from the change of paper type exceeds the permissible range and notifies the user to that effect.

In the present exemplary embodiment, an example is illustrated in which a dimension with respect to the thickness at a predetermined position of an output product (the thickness of the paper stack used as the bookblock) is obtained by post-processing of a print product using settings for a thickness D1 (D2) of the bookblock 1702 prior to a change (after a change).

Figure 24:
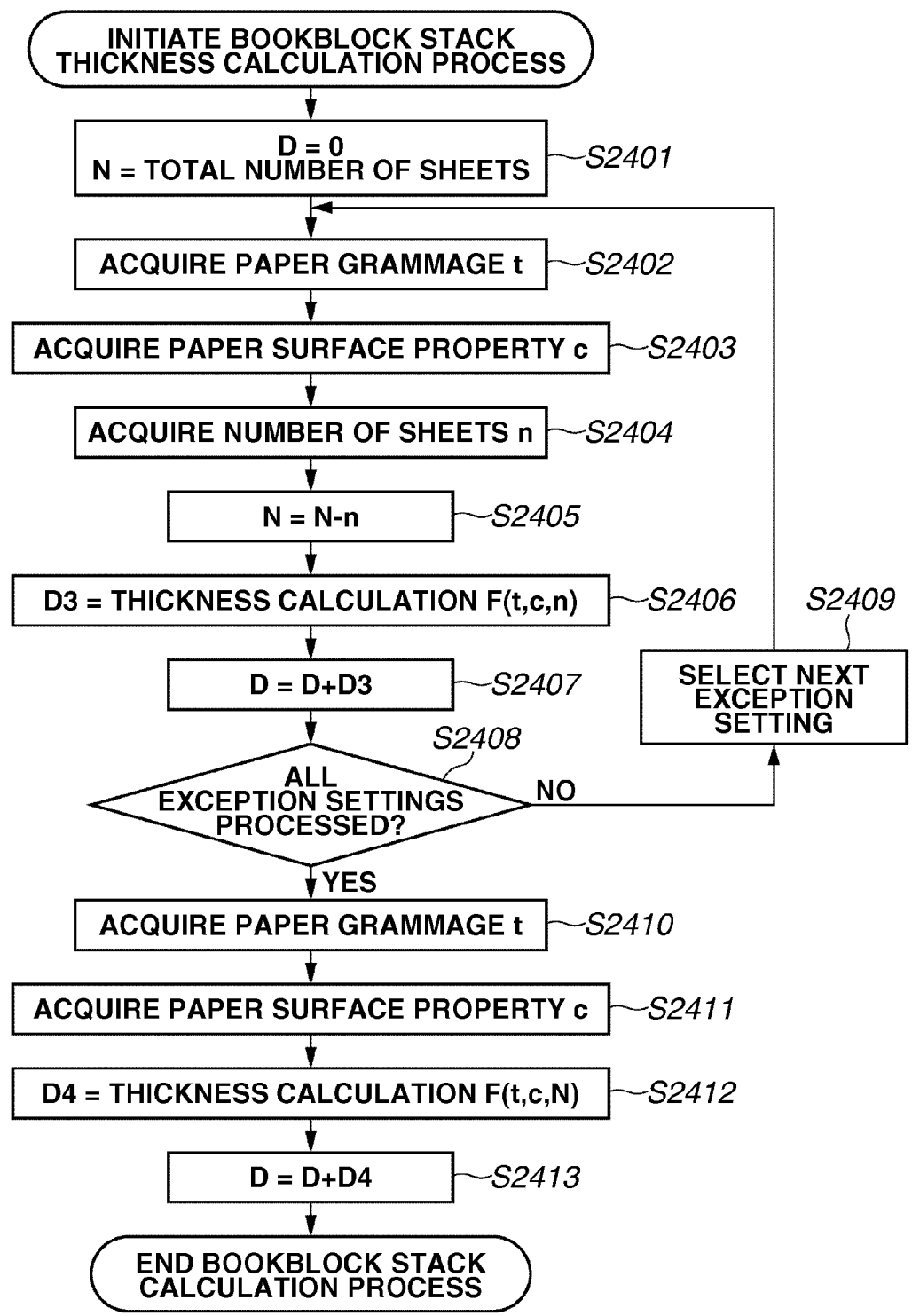
FIG. 24 is a flowchart illustrating an actual example of processing for calculating the bookblock thickness implemented in step S2305 and step S2306 in FIG. 23 according to an exemplary embodiment of the present invention.

FIG. 24 is a flowchart illustrating an actual example of the process for calculating the bookblock thickness implemented in step S2305 and step S2306 in FIG. 23. In step S2401, the in-device job management unit 14 initializes a variable D to a value of zero and initializes a variable N to the number of sheets of paper in the bookblock 1702 in the print job. The number of sheets of paper in the bookblock 1702 can be calculated from the job ticket 91. Furthermore, the variables D and N are, for example, stored in the RAM 202.

Then in step S2402, the in-device job management unit 14 acquires a grammage t of the paper type specified by a processing exception setting. The information for paper type written in the job ticket 91 is the paper ID. Thus, the in-device job management unit 14 searches the paper information 2100 corresponding to this paper ID in the list of paper information 2100 recorded in the RAM 202 or the HD 205 and acquires information for the grammage t corresponding to the paper ID.

Then in step S2403, the in-device job management unit 14 implements a similar processing to step S2402 and acquires information for surface property c of the paper type specified by the processing exception setting. Then in step S2404, the in-device job management unit 14 uses the specified range for the processing exception setting to acquire the number of sheets of paper n.

Then in step S2405, the in-device job management unit 14 subtracts the number of sheets of paper n acquired in step S2805 from the variable N. By subtracting the number of sheets of paper n from the variable N for all exceptional settings, the number of sheets of paper is set to the variable N in a setting other than exception settings when the processing exits the loop of steps S2402 to S2409.

Next in step S2406, the in-device job management unit 14 uses information for the grammage t, surface property c, and number of sheets of paper n acquired in step S2402 to step S2404 to calculate a thickness D3 for paper in processing exception setting copies. Then in step S2407, the in-device job management unit 14 adds the thickness D3 for paper covered by the exception setting portion calculated in step S2407 to the variable D.

Next in step S2408, the in-device job management unit 14 determines whether processing has been performed with respect to all exception settings included in the printing attributes 1005 of the job ticket 91. When it is determined that processing with respect to all exception settings has not yet been performed (NO in step S2408), the processing proceeds to step S2409. In step S2409, the in-device job management unit 14 selects the next exception setting included in the printing attributes 1005 of the print job 91, and the processing then returns to step S2402.

When processing has been performed with respect to all exception settings (YES in step S2408), the processing proceeds to step S2410. In step S2410, in a similar manner to step S2802, the in-device job management unit 14 acquires a grammage t corresponding to the paper type from the information for paper type in a basic setting which is not an exception setting.

Then in step S2411, in a similar manner to step S2803, the in-device job management unit 14 acquires the surface property c corresponding to the paper type from the information in the basic setting for the paper type.

Then in step S2412, the in-device job management unit 14 calculates a thickness D4 for paper in the basic setting portion using information for the grammage t, surface property c, and variable N for the paper type in the basic setting.

Then in step S2413, the in-device job management unit 14 determines the thickness D (that is to say, the thickness D1 or D2 for the bookblock 1702) for paper in the entire print job by adding the thickness D4 for paper calculated in step S2412 to the variable D.

Figure 25:
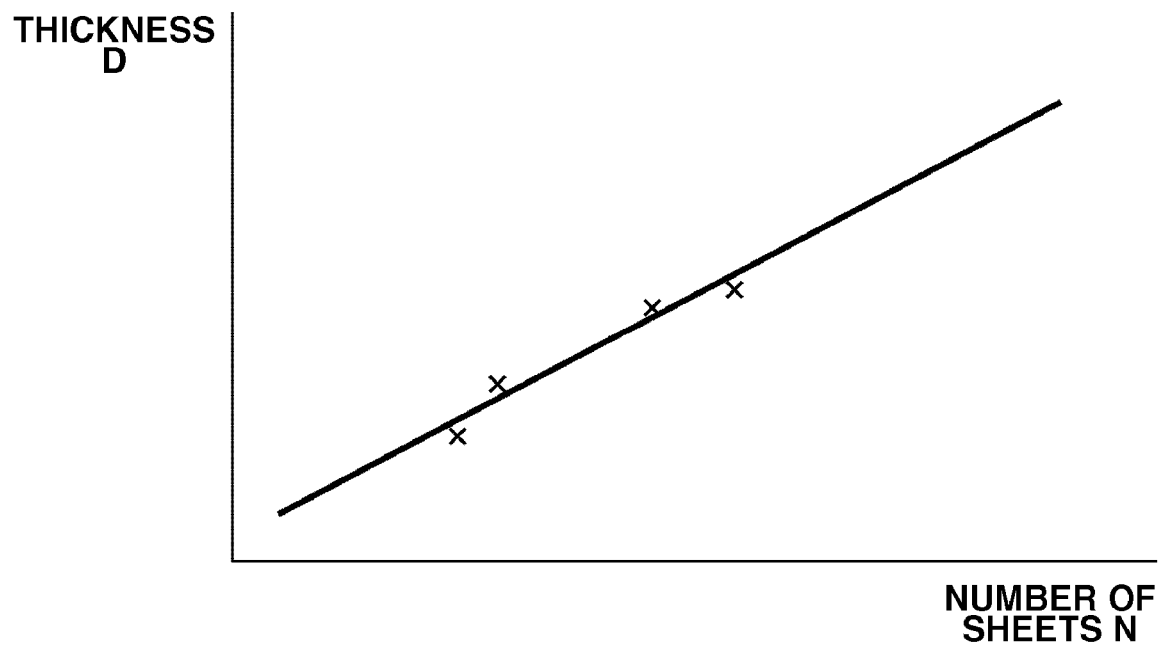
FIG. 25 schematically illustrates an example of a principle for calculating a thickness in step S2506 and step S2412 in FIG. 24 according to an exemplary embodiment of the present invention.

FIG. 25 schematically illustrates an example of a principle for calculating a thickness in step S2406 and step S2412 in FIG. 24.

The relationship between thickness D and number of sheets of paper N for each surface property c and grammage t is measured in advance and those results are plotted on a graph to prepare an approximation function expressing a relationship between thickness D and number of sheets of paper N. The relationship of thickness D and number of sheets of paper N can be approximated to a first-order function of $D = A \times N$. The constant A is a value calculated using the grammage t and the surface property c. Surface property c is divided into two categories depending on the presence or absence of a surface coating. Using paper of the respective surface properties c, thickness D is plotted while varying the grammage t to approximate the relationship of the grammage t to the thickness D to a function. Then, thicknesses D3, D4 can be calculated by applying the grammage t, surface property c, and number of sheets of paper N to the approximation function.

Thus, in the present exemplary embodiment, the print server 101 checks the job ticket 91 for a print job undergoing processing. When the printing method set in the printing attributes 1005 in the job ticket 91 is a case binding method, the thickness D2 is calculated for the bookblock 1702 of the paper type set in the print attribute 1005. Furthermore, the print server 101 calculates a thickness D1 of the calculated bookblock 1702 for the paper type after the change. The print server 101 changes the paper type set in the job ticket 91 only when the difference of those thicknesses D1 and D2 for the calculated bookblock 1702 is within a permissible range.

In this manner, in the present exemplary embodiment, when the paper is changed, the stack thickness of the bookblock when using the paper before the change is compared with the stack thickness of the bookblock when using the paper after the change to determine whether the difference of the thicknesses is within the permissible range. Thus, a great change in the thickness of a paper stack can be avoided, and an output product that matches the estimated spine thickness can be obtained. Consequently, post-print processing in which processing results are affected by paper thickness can be more adequately performed.

The present exemplary embodiment is described using an example of case binding in which the settings for post-processing require a limit on paper type. However, as long as the settings are made for post-print processing in which processing results are affected by paper thickness, the settings for post-processing requiring a limit on paper type are not limited to case binding. For example, the settings may be applied to tape binding.

Figure 26:
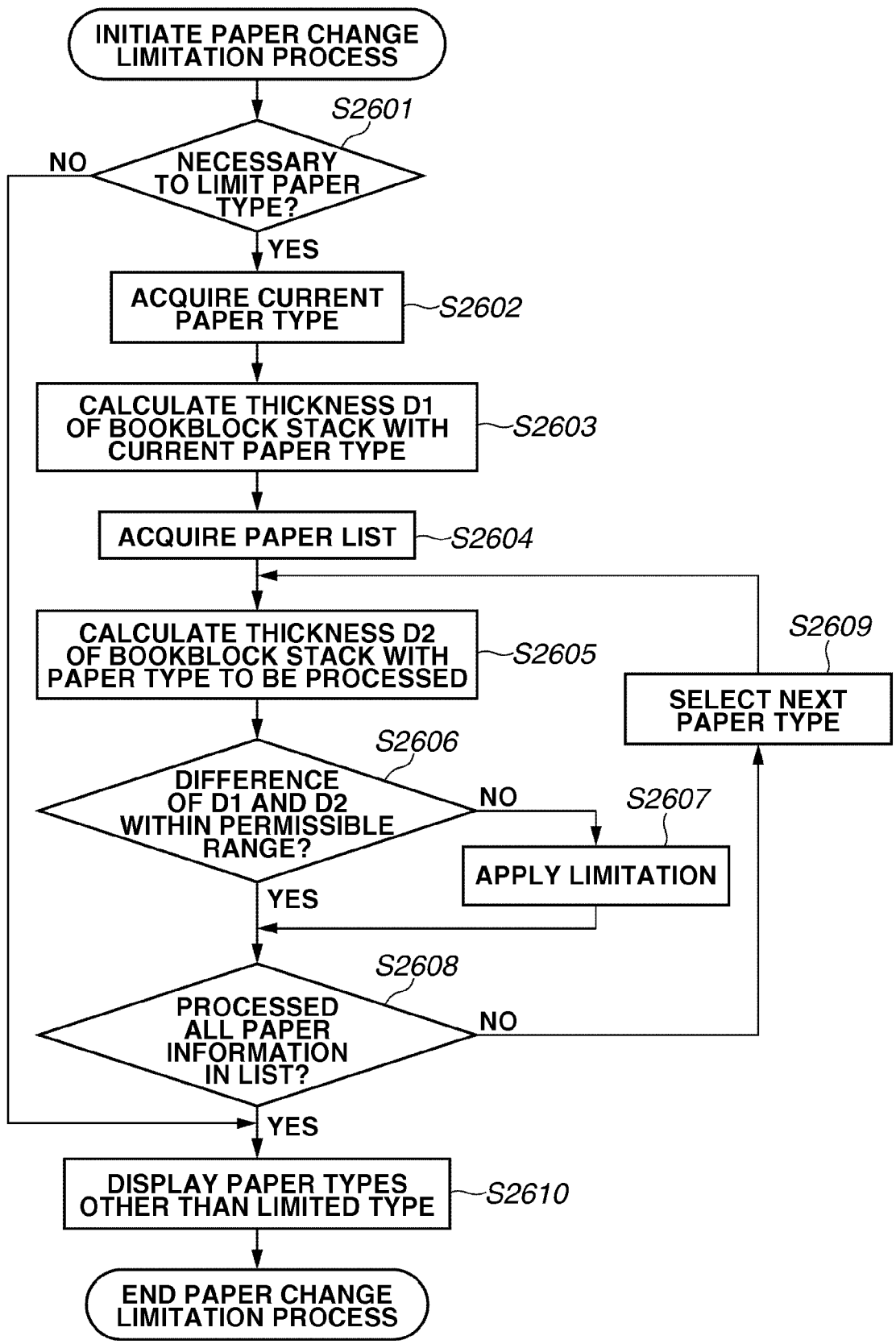
FIG. 26 is a flowchart schematically illustrating another example of print server processing configured to use a bookblock thickness to limit a change to paper type in the event that a user changes the paper type for a print job according to an exemplary embodiment of the present invention.

FIG. 26 is a flowchart schematically illustrating another example of processing by the print server 101 in which the thickness of the bookblock 1702 is used to limit a change to paper type when a user changes the paper type for a print job. The description herein will use an example in which only useable types of paper such as those paper types which have no effect on the thickness of the bookblock will be enumerated rather than enumerating all useable paper types. Although an example is described herein in which the print server 101 performs processing operations, these processing operations may be performed by the client computers 102-104 or the network printers 105 and 106.

In step S2601, the in-device job management unit 14 examines the job ticket 91 for the print job being processed and determines whether there is a need for a limit on a change to paper type in the settings for post-processing of a print product. More specifically, the in-device job management unit 14 determines whether the printing method set in the printing attributes 1005 is a case binding method. If it is determined that the printing method is not case binding (NO in step S2601), the processing proceeds to step S2610.

When the result of step S2601 is YES and the printing method is a case binding method, the processing proceeds to step S2602. In step S2602, the in-device job management unit 14 acquires information for the currently set paper type from the printing attributes 1005 of the job ticket 91.

Then in step S2603, the in-device job management unit 14 calculates the thickness D1 of the bookblock 1702 required for printing with the paper type acquired in step S2602. Then in step S2604, the in-device job management unit 14 reads a list of the recorded paper information 2100 from the RAM 202 or the HD 205.

In step S2605, the in-device job management unit 14 calculates the thickness D2 of the bookblock 1702 using the currently processed paper information 2100 in the list acquired in step S2604.

Then in step S2606, the in-device job management unit 14 compares the thicknesses D1 and D2 for the bookblock 1702 and determines whether the difference (of the absolute values) of those thicknesses is within a predetermined range of permissible values. When it is determined that the difference (of the absolute values) of thicknesses D1 and D2 of the bookblock 1702 is within the range of permissible values (YES in step S2606), the processing proceeds to step S2608. When the result of step S2307 is NO, the processing proceeds to step S2607. In step S2607, the in-device job management unit 14 designates the currently processed paper information 2100 as a limit, and the processing then proceeds to step S2608. In step S2608, the in-device job management unit 14 determines whether processing has been performed with respect to all paper information 2100 in the list acquired in step S2604. When it is determined that processing with respect to all paper information 2100 has not yet been performed (NO in step S2608), the processing proceeds to step S2609. In step S2609, the in-device job management unit 14 selects the next paper information 2100 in the list acquired in step S2604, and the processing then returns to step S2605.

When processing has been performed with respect to all paper information 2100 (YES in step S2608), the processing proceeds to step S2610. In step S2610, the display 11 notifies a user by displaying undesignated items as a limit in step S2607 from the list of paper information 2100 read in step S2604 and then completes the processing with respect to the flowchart in FIG. 26.

In the present exemplary embodiment, an example is illustrated in which a dimension with respect to the thickness at a predetermined position of an output product (the thickness of the paper stack used as the bookblock) is obtained by post-processing of a print product using settings for a thickness D1 (D2) of the bookblock 1702 prior to a change (after a change).

In step S2601, although the setting details of the job ticket 91 are checked, this checking operation is not always necessary. For example, the GUI may be used to switch a limit implemented on a paper type.

FIG. 27 illustrates another example of a dialog window displayed by a user pressing the button 1501. The dialog window 2700 illustrated in FIG. 27 includes a check box 2701 for switching the implementation of a limit on paper type, in addition to the items of the dialog window 1600 illustrated in FIG. 16.

For example, in step S2601 in FIG. 26, the On/Off state of the check box 2701 is determined. When the check box 2701 is On, processing operations after step S2602 are performed. On the other hand, when the check box 2701 is Off, processing operations in steps S2302 and S2304-S2309, the processing operations in step S2303, and the processing operation in step S2610 in FIG. 23 are performed. In this manner, switching of processing by the GUI is implemented.

Furthermore, both control of GUI and checking of the setting details of the job ticket 91 may be performed. For example, firstly when it is determined to limit paper type, processing operations after step S2602 are only performed only when determination of the On/Off state of the check box 2701 shows that the check box 2701 is On. Conversely, even when it is determined to limit paper type, when the check box 2701 is Off, the processing operation in steps S2302 and S2304-S2309 in FIG. 23 are performed. Furthermore, when it is determined not to limit paper type, the processing in step S2610 is performed.

FIGS. 28A and 28B illustrate a first modified example of a job ticket. More specifically, FIG. 28A illustrates an example of a job ticket 2800 and FIG. 28B illustrates an example of spine information in the job ticket 2800.

In FIG. 28A, the printing attributes 1005 of the job ticket 2800 include the job name 2801, the printer name 2802, the printing method 2803, the number of copies 2804, collation by type 2805, the staple setting 2806, and the paper type 2807. In addition, the printing attributes 1005 include the following information, namely at least one piece of spine information. FIG. 28A illustrates an example in which two pieces of spine information 2808a and 2808b are included in the job ticket 2800.

As illustrated in FIG. 28B, the spine information 2808 includes a spine original link 2809, a spine thickness 2810, which is information related to the thickness of the spine, the bookblock stack grammage 2811, which is the grammage of the paper in the bookblock, and the bookblock stack surface property 2812, which indicates the surface property of paper in a bookblock. The spine original link 2809 is link information to a page used in the spine in the job ticket 2800.

Figure 29:
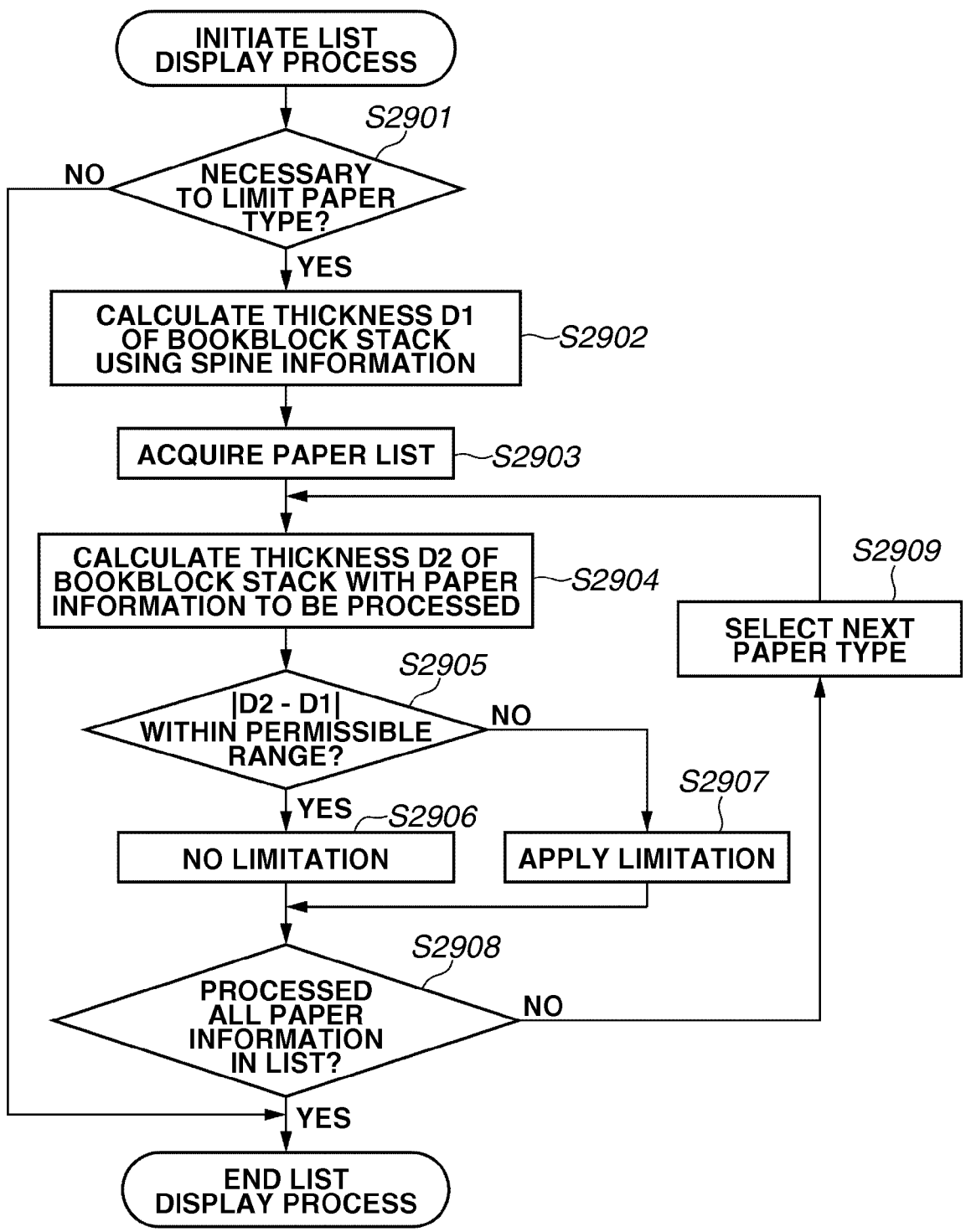
FIG. 29 is a flowchart illustrating an example of print server processing configured to control a dialog window using job ticket information illustrated in FIG. 28A according to an exemplary embodiment of the present invention.

FIG. 29 is a flowchart illustrating an example of a processing operation performed by the print server 101 for controlling the dialog window 1600 using information from the job ticket 2800 illustrated in FIG. 28A. Although an example is described herein in which the print server 101 performs processing operations, these processing operations may be performed by the client computers 102-104 or the network printers 105 and 106.

In step S2901, the in-device job management unit 14 examines the printing method 2803 in the print ticket 2800 of the print job being processed and determines whether a change to paper type settings requires a limit. More specifically, the in-device job management unit 14 determines whether the printing method 2803 is a case binding method. If it is determined that there is no need for a limit with respect to a change for the paper type settings (NO in step S2901), the processing ends with respect to the flowchart in FIG. 29.

When it is determined that there is a need to limit a change to the paper type settings (YES in step S2901), the processing proceeds to step S2902. In step S2902, the in-device job management unit 14 uses the bookblock stack grammage 2811 and the bookblock stack surface property 2812 included in the spine information 2808 to calculate the thickness D1 of the bookblock 1702.

Then in step S2903, the in-device job management unit 14 reads a list of the recorded paper information 2100 from the RAM 202 or the HD 205 in a similar manner to step S2604 in FIG. 26. In step S2904, the in-device job management unit 14 calculates the thickness D2 of the bookblock 1702 using the currently processed paper information 2100.

Then in step S2905, the in-device job management unit 14 compares the thickness D1 for the bookblock 1702 calculated in step S2902 with the thickness D2 for the bookblock 1702 calculated in step S2904 and determines whether the difference (of the absolute values) of those thicknesses is within a predetermined range of permissible values. When it is determined that the difference is within the range of permissible values (YES in step S2905), the processing proceeds to step S2906. In step S2906, the in-device job management unit 14 performs settings to enumerate paper information 2100 currently being processed in the dialog window 1600.

On the other hand, when the result of step S2905 is NO and the difference is not within the range of permissible values, the processing proceeds to a step S2907. In step S2907, the in-device job management unit 14 performs settings to remove paper information 2100 currently being processed from the dialog window 1600.

In the present exemplary embodiment, an example is illustrated in which a dimension with respect to the thickness at a predetermined position of an output product (the thickness of the paper stack used as the bookblock) is obtained by post-processing of a print product using settings for a thickness D1 (D2) of the bookblock 1702 prior to a change (after a change).

When the processing proceeds to step S2908, the in-device job management unit 14 determines whether processing has been performed with respect to all paper information 2100 in the list acquired in step S2903. When it is determined that processing with respect to all paper information 2100 has not yet been performed (NO in step S2908), the processing proceeds to step S2909. In step S2909, the in-device job management unit 14 selects the next paper information 2100 in the list acquired in step S2903, and the processing then returns to step S2904. When processing has been performed with respect to all paper information 2100 (YES in step S2908), the processing ends with respect to the flowchart in FIG. 29.

In FIG. 29, an example is described which uses the thicknesses D1 and D2 of the bookblock 1702. However, in step S2902, a thickness D for the spine calculated from the spine information 2808 included in the job ticket 91 may be compared with a thickness d for the spine calculated from the paper information 2100 for paper type which is re-specified by a user. Furthermore, the thickness D for the spine may be compared with the thickness D2 for the bookblock 1702.

Figure 30:
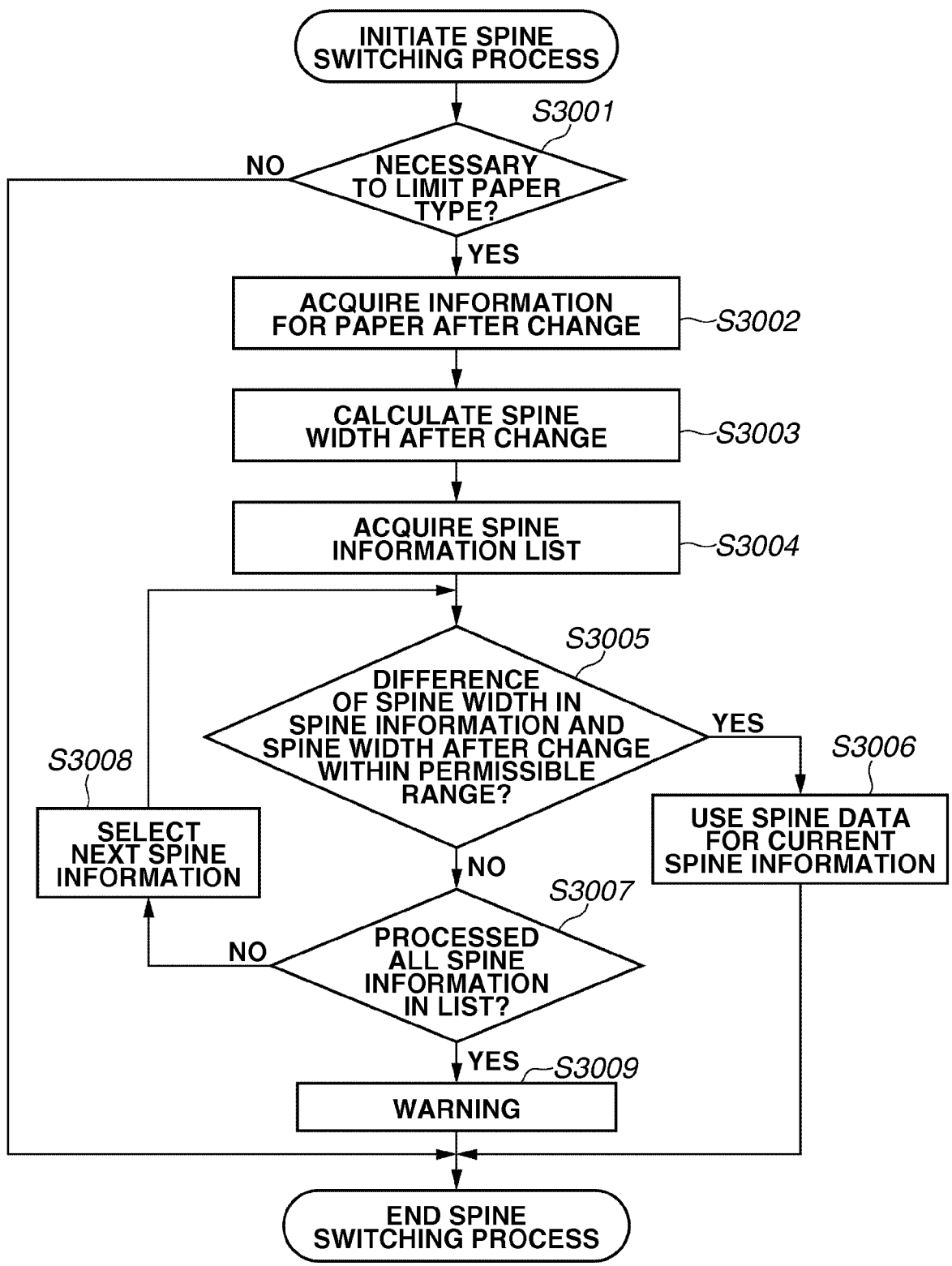
FIG. 30 is a flowchart illustrating an example of print server processing configured to switch a spine using job ticket information illustrated in FIG. 28A according to an exemplary embodiment of the present invention.

FIG. 30 is a flowchart illustrating an example of a processing operation by the print server 101 for switching the spine to be used by using information in the job ticket 2800 illustrated in FIG. 28A without placing a limit on a change to the paper settings. Although an example is described herein in which the print server 101 performs processing operations, these processing operations may be performed by the client computers 102-104 or the network printers 105 and 106.

In step S3001, the in-device job management unit 14 examines the printing method 2803 of the job ticket 2800 and determines whether there is a need for a limit on a change to the paper type settings. More specifically, the in-device job management unit 14 determines whether the printing method 2803 is a case binding method. If it is determined that there is no need for a limit on a change for the paper type settings (NO in step S3001), the processing ends with respect to the flowchart in FIG. 30.

When it is determined that there is a need for a limit with respect to a change for the paper type settings (YES in step S3001), the processing proceeds to step S3002. In step S3002, the in-device job management unit 14 acquires information for paper type re-specified by a user from the list of paper information 2100 read from the RAM 202 or the HD 205.

Then in step S3003, the in-device job management unit 14 calculates the thickness d of the spine using the paper information 2100 for paper type re-specified by a user in the dialog window 1600.

In step S3004, the in-device job management unit 14 reads the list of spine information 2808 from the job ticket 2800. Then in step S3005, the in-device job management unit 14 uses the information for the bookblock stack grammage 2811 included in the currently processed spine information and information for the bookblock stack surface property 2812 to calculate an estimated spine thickness D. The in-device job management unit 14 determines whether the difference (of the absolute value) of the thickness D for the spine and the thickness d for the spine calculated in step S3003 is within a permissible range.

When it is determined that the difference is not within the permissible range (NO in step S3005), the processing proceeds to step S3007. In step S3007, the in-device job management unit 14 determines whether processing has been performed with respect to all spine information 2808 in the list acquired in step S3004. When it is determined that processing has not yet been performed with respect to all spine information 2808 (NO in step S3007), the processing proceeds to step S3008. In step S3008, the in-device job management unit 14 selects the next spine information 2808, and the processing then returns to step S3005.

When it is determined that processing with respect to all spine information 2808 has been performed (YES in step S3007), the processing proceeds to step S3009. In step S3009, the display unit 11 displays a warning screen to notify a user that, irrespective of which spine 2808 included in the job ticket 2800 is used, the difference of the thicknesses for the spine before and after the change will exceed the permissible range. Thereafter, the processing ends with respect to the flowchart in FIG. 30.

On the other hand, when the result of step S3005 is YES and the difference of the spine thickness D or d is within the permissible range, the processing proceeds to a step S3006. In step S3006, the in-device job management unit 14 performs settings to use currently processed spine information of the spine information 2808 in the list acquired in step S3004. Thereafter, the processing ends with respect to the flowchart in FIG. 30.

In the present exemplary embodiment, an example is illustrated in which a dimension with respect to the thickness at a predetermined position of an output product (the spine width of the output product) is obtained by post-processing of a print product using settings for a thickness D (d) of the spine prior to a change (after a change).

FIG. 31 illustrates a second modified example of a job ticket. In FIG. 31, a job ticket 3100 includes information for spine thickness 3101 indicating a thickness of a spine in substitution for the spine information 2808 included in the job ticket 2800 illustrated in FIG. 28A. The spine thickness 3101 is the estimated thickness when preparing a spine and, for example, it is the stated width for the spine identified in the edit box 2002 of the dialog window 2000 illustrated in FIG. 20.

FIG. 32 illustrates a third modified example of a job ticket. In FIG. 32, in contrast to the job ticket 3100 illustrated in FIG. 31, a job ticket 3200 includes information for images (yes/no) 3201 and information for coloring (yes/no) 3202. For example, in coloring (yes/no) 3202, the input column 2004 for the dialog window 2000 illustrated in FIG. 20 indicates whether an image has been selected by type of an object to be printed on the spine.

In step S2902 in FIG. 29, the thickness D is calculated using the spine stack grammage 2811 and the spine surface property 2812 of the job ticket 2800. However, when using the job tickets 3100 and 3200 illustrated in FIG. 31 and FIG. 32, since the thickness of the spine is stated in the spine thickness 3101, that thickness may be used without modification as the thickness D.

In step S2901 in FIG. 29, control of the dialog window 1600 is performed by examining the printing method 2803 of the job ticket 2800. However, when using the job ticket 3200 illustrated in FIG. 32, data including images (yes/no) 3201 and information for coloring (yes/no) 3202 may be taken into account in steps S2301, S2601, and S2901. In other words, if the image in the spine does not include coloring, the setting for post-processing of a print product may be treated as a setting not requiring a limit on paper type and thus it is possible to determine not to apply a limit on the thickness irrespective of the setting for the post-processing of the print product.

The permissible range used in step S2307 in FIG. 23, step S2606 in FIG. 26, and step S3005 in FIG. 30 may be a fixed value (range) notwithstanding the thickness D1 or D2 of the bookblock 1702 and the thickness D or d of the spine. Furthermore, conversely, the permissible range may be varied according to the thickness D1 or D2 of the bookblock 1702 and the thickness D or d of the spine.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-319990 filed Dec. 16, 2008, which is hereby incorporated by reference herein in its entirety.

What is claimed is:

1. A print processing system configured to receive a print job input from an application and to retain and edit the print job, the print processing system comprising:
   a first determination unit configured to determine whether a setting related to post-processing of a print product in the print job is affected by paper thickness;
   a second determination unit configured to determine whether a difference between a first dimension and a second dimension is within a first permissible range when the first determination unit determines that the setting related to post-processing of the print product in the print job is affected by paper thickness, the first dimension being with respect to a direction of thickness at a predetermined position on an output product obtained by post-processing of the print product before a change in the setting and the second dimension being with respect to a direction of thickness at a predetermined position on an output product obtained by post-processing of the print product after the change in the setting;
   a setting change unit configured to change the setting related to post-processing of the print product to the setting after the change when the second determination unit determines that the difference between the first dimension and the second dimension is within the first permissible range; and
   a setting change limitation unit configured to limit a change on the setting related to post-processing of the print product when the second determination unit determines that the difference between the first dimension and the second dimension is not within the first permissible range.

2. The print processing system according to claim 1, wherein the setting determined by the first determination unit to be affected by paper thickness is case binding.

3. The print processing system according to claim 1, further comprising:
   a first paper thickness calculation unit configured to calculate a thickness of a stack of paper used as a bookblock in the setting before a change based on a type of paper set in the print job; and
   a second paper thickness calculation unit configured to calculate a thickness of a stack of paper used as a bookblock in the setting after the change, wherein the second determination unit determines whether a difference between the thickness of the stack of paper calculated by the first paper thickness calculation unit and the thickness of the stack of paper calculated by the second paper thickness calculation unit is within a second permissible range.

4. The print processing system according to claim 3, wherein the second permissible range is a fixed value irrespective of thickness of the paper stack.

5. The print processing system according to claim 3, wherein the second permissible range varies according to the thickness of a paper stack.

6. The print processing system according to claim 1, wherein the first determination unit is configured to determine that the setting related to post-processing of the print product in the print job is not affected by paper thickness when predetermined information is not included in information related to a spine set in the print job.

7. The print processing system according to claim 6, wherein the predetermined information is information indicating that an image is drawn on the spine.

8. The print processing system according to claim 1, wherein the setting change unit is configured to change the setting related to post-processing of the print product so that a difference between a spine width of an output product produced according to post-processing of the print product using the setting before a change and a spine width of an output product produced according to post-processing of the print product using the setting after the change is within a third permissible range, the spine width being of an output product obtained based on information related to a spine set in the print job.

9. The print processing system according to claim 8, wherein the information related to the spine set in the print job includes information about the width of the spine.

10. A print processing method for receiving a print job input from an application and retaining and editing the print job, the print processing method comprising:
determining whether a setting related to post-processing of a print product in the print job is affected by paper thickness;
determining whether a difference between a first dimension and a second dimension is within a first permissible range when it is determined that the setting related to post-processing of the print product in the print job is affected by paper thickness, the first dimension being with respect to a direction of thickness at a predetermined position on an output product obtained by post-processing of the print product before a change in the setting and the second dimension being with respect to a direction of thickness at a predetermined position on an output product obtained by post-processing of the print product after the change in the setting;
changing the setting related to post-processing of the print product to the setting after the change when it is determined that the difference between the first dimension and the second dimension is within the first permissible range; and
limiting a change on the setting related to post-processing of the print product when it is determined that the difference between the first dimension and the second dimension is not within the first permissible range.

11. The print processing method according to claim 10, wherein the setting determined to be affected by paper thickness is case binding.

12. The print processing method according to claim 10, further comprising:
calculating a first thickness of a stack of paper used as a bookblock in the setting before a change based on a type of paper set in the print job;
calculating a second thickness of a stack of paper used as a bookblock in the setting after the change; and
determining whether a difference between the calculated first thickness and the calculated second thickness is within a second permissible range.

13. The print processing method according to claim 12, wherein the second permissible range is a fixed value irrespective of a thickness of a paper stack.

14. The print processing method according to claim 12, wherein the second permissible range varies according to a thickness of a paper stack.

15. The print processing method according to claim 10, the method further comprising determining that the setting related to post-processing of the print product is not affected by paper thickness when predetermined information is not included in information related to a spine set in the print job.

16. The print processing method according to claim 15, wherein the predetermined information is information indicating that an image is drawn on the spine.

17. The print processing method according to claim 10, further comprising changing the setting related to post-processing of the print product so that a difference of a spine width of an output product produced according to post-processing of the print product using the setting before the change and a spine width of the output product produced according to post-processing of the print product using the setting after the change is within a third permissible range, the spine width being of an output product obtained based on information related to a spine set in the print job.

18. The print processing method according to claim 17, wherein the information related to a spine set in the print job includes information about a width of a spine.

19. A non-transitory computer-readable storage medium storing a computer program for causing a computer to execute a method for receiving a print job input from an application and retaining and editing the print job, the method comprising:
determining whether a setting related to post-processing of a print product in the print job is affected by paper thickness;
determining whether a difference between a first dimension and a second dimension is within a permissible range when it is determined that the setting related to post-processing of the print product in the print job is affected by paper thickness, the first dimension being with respect to a direction of thickness at a predetermined position on an output product obtained by post-processing of the print product before a change in the setting and the second dimension being with respect to a direction of thickness at a predetermined position on an output product obtained by post-processing of the print product after the change in the setting;
changing the setting related to post-processing of the print product to the setting after the change when it is determined that the difference between the first dimension and the second dimension is within the permissible range; and
limiting the change on the setting related to post-processing of the print product when it is determined that the difference between the first dimension and the second dimension is not within the permissible range.

* * * * *